US010026148B2

(12) United States Patent
Okumura

(10) Patent No.: US 10,026,148 B2
(45) Date of Patent: Jul. 17, 2018

(54) IMAGE RECOGNITION METHOD, IMAGE RECOGNITION DEVICE AND IMAGE RECOGNITION PROGRAM

(71) Applicant: Renesas Electronics Corporation, Tokyo (JP)

(72) Inventor: Shunsuke Okumura, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 135 days.

(21) Appl. No.: 15/064,472

(22) Filed: Mar. 8, 2016

(65) Prior Publication Data
US 2016/0283801 A1    Sep. 29, 2016

(30) Foreign Application Priority Data

Mar. 27, 2015 (JP) ................................ 2015-066302

(51) Int. Cl.
| | |
|---|---|
| *G06K 9/68* | (2006.01) |
| *G06K 9/46* | (2006.01) |
| *G06T 7/00* | (2017.01) |
| *G06T 1/60* | (2006.01) |
| *G06K 9/32* | (2006.01) |
| *G06K 9/00* | (2006.01) |

(52) U.S. Cl.
CPC .............. *G06T 1/60* (2013.01); *G06K 9/3241* (2013.01); *G06K 9/4642* (2013.01); *G06K 9/00362* (2013.01); *G06T 2200/28* (2013.01)

(58) Field of Classification Search
CPC .............. G06K 9/3241; G06K 9/4642; G06K 9/00362; G06T 1/60; G06T 2200/28
See application file for complete search history.

(56) References Cited

U.S. PATENT DOCUMENTS

| | | | |
|---|---|---|---|
| 2012/0051592 A1* | 3/2012 | Yashiro | ................ G06K 9/3241 382/103 |
| 2012/0076408 A1* | 3/2012 | Suk | ...................... G06K 9/3241 382/173 |
| 2016/0005171 A1* | 1/2016 | Watanabe | .......... G06K 9/00677 382/118 |

FOREIGN PATENT DOCUMENTS

| | | |
|---|---|---|
| JP | 2002-140706 A | 5/2002 |
| JP | 2008-134791 A | 6/2008 |

* cited by examiner

*Primary Examiner* — Jon Chang

(74) *Attorney, Agent, or Firm* — McGinn IP Law Group, PLLC

(57) ABSTRACT

The image recognition method includes: setting ROIs in an image of one image plane; and searching for a region including a recognition-targeted image. The method involves dictionary data including feature quantities calculated from blocks forming a recognition-targeted region including a recognition-targeted image and having blocks concerning the region. Focusing on one block in the image plane, feature quantities are calculated, which make block-of-interest feature quantities. With each of ROIs including the block, inner products of feature quantities calculated from a block corresponding to the one block in the dictionary data, and block-of-interest feature quantities are accumulatively added into evaluation value intermediate data for ROI. Whether or not each ROI includes the recognition-targeted image is determined on an evaluation value of ROI on which the accumulative addition has been finished on all of blocks forming the ROI. The noticed blocks are sequentially scanned in the image plane.

20 Claims, 21 Drawing Sheets

Fig.12

| ROI size | | Cell size | | Block size | | | | feature-dimension |
|---|---|---|---|---|---|---|---|---|
| width | height | width | height | # of cell row | # of cell column | # of block | # of bins | |
| 16 | 32 | 4 | 4 | 2 | 2 | 21 | 8 | 672 |

Fig.14

| % | Image - width | Image - height | search step (Horizontal) (32 pixels) | search step (Vertical) (32 pixels) | # of ROI Rows | # of ROI Columns | # of ROI (32 pixels) | # of Block Rows | # of Block Columns | # of Block |
|---|---|---|---|---|---|---|---|---|---|---|
| 1 | 100.00% | 1,920 | 1,080 | 2 | 4 | 953 | 5 | 4,765 | 957 | 11 | 10,527 |

Fig.15

| | | Method based on feature quantity map creation | Method based on feature quantity creation in ROIs | First embodiment |
|---|---|---|---|---|
| Method | | | | |
| Loop structure | | for(i=0; i < Image_height; step_l_h++){<br>for(j=0; I < Image_width; step_l_w++){<br><<Description of feature quantity>><br><<Creation of feature quantity map<br>and write thereto>><br>}<br>}<br>for(i=0; i < Image_height; step_l_h++){<br>for(j=0; I < Image_width; step_l_w++){<br>for(k=0; l < Block_height; k++){<br>for(l=0; I < Block_width; l++){<br><<Read of feature quantity map>><br><<Deriving a score>><br>}<br>}<br><<Determination>><br>}<br>} | for(i=0; i < Image_height; step_l_h++){<br>for(j=0; I < Image_width; step_l_w++){<br>for(k=0; l < Block_height; k++){<br>for(l=0; I < Block_width; l++){<br><<Creation of block feature<br>quantity>><br>}<br>}<br><<Deriving a score>><br><<Determination>><br>}<br>} | for(i=0; i < Image_height; step_l_h++){<br>for(j=0; I < Image_width; step_l_w++){<br><<Creation of block feature<br>quantity>><br>for(k=0; l < Block_height; k++){<br>for(l=0; I < Block_width; l++){<br><<Deriving a score>><br>}<br>}<br><<Determination>><br>}<br>} |
| Number of operations by loop(*1) | Block feature quantity creation | A*B | A*B*C*D | A*B |
| | Derive scores (The number of inner products of block feature quantities) | A*B*C*D | A*B*C*D | A*B*C*D |
| | Determination | A*B | A*B | A*B |
| Quantity of generated intermediate data (*2) | Description | [Number of block feature quantities]*<br>[Block feature quantity data size] | C*D* [Block feature quantity data size] | [ROI number]*[Data size] |
| | Example | 673,728[Byte]<br>(=10,527*32*2[Byte]) | 1,344[Byte]<br>(=672*2[Byte]) | 19,060[Byte]<br>(=4,765*4[byte]) |
| Number of operations | | Small | Large | Small |
| Data capacity/Quantity of transmission | | Large | Small | Small |

*1) A = Image_height/step_l_h, B = Image_width/step_l_w
C = Block_height, D = Block_width

Fig.19

| Method based on feature quantity map creation | Method based on feature quantity creation in ROIs | First embodiment |
|---|---|---|
| The method is implemented so that the functions are executed in the order of [1], [2] and [3].<br><br>[1] Function to create a feature quantity map with an image as an input.<br><br>Ex: create_feature_map (<input image>, <feature quantity map>, <another>)<br><br>[2] Function to take data of ROI region from the feature quantity map and linking the data.<br><br>Ex: create_roi_feature (<feature map>, <ROI feature quantity>, <another>)<br><br>[3] Function to derive evaluation values with ROI feature quantities and dictionary data as inputs.<br><br>Ex: detector (<ROI feature quantity>, <dictionary data>, <evaluation value>, <another>) | The method is implemented so that the functions are executed in the order of the following functions [1] and [2].<br><br>[1] Function to create ROI feature quantities with an image and coordinates of a cutout in the image as inputs.<br><br>Ex: create_roi_feature (<input image>, <coordinates>, <ROI feature quantity>, <another>)<br><br>[2] Function to derive evaluation values with ROI feature quantities and dictionary data as inputs.<br><br>Ex: detector (<ROI feature quantity>, <dictionary data>, <evaluation value>, <another>) | The method is implemented so that the function labeled with [1] is executed.<br><br>[1] Function to send back detected coordinates in with an image and dictionary data as inputs.<br><br>Ex: scan_detector (<input image>, <dictionary data>, <coordinate data array of results of detection>, <score map IN ROIs>) |

IMAGE RECOGNITION METHOD, IMAGE RECOGNITION DEVICE AND IMAGE RECOGNITION PROGRAM

CROSS-REFERENCE TO RELATED APPLICATIONS

The Present application claims priority from Japanese application JP 2015-066302 filed on Mar. 27, 2015, the content of which is hereby incorporated by reference into this application.

BACKGROUND

The present invention relates to an image recognition method, an image recognition device and an image recognition program, and particularly relates to an image recognition method, an image recognition device and an image recognition program which can be suitably used for search for a target image.

An image recognition technique for searching a taken image for a target object at a high speed has been in the spotlight. With ADAS (Advanced Driving Assistant System), for example, a pedestrian, another vehicle, etc. are recognized from an image taken by a camera provided on a motor vehicle. For such recognition, a image region of interest is selected from a taken image, and feature quantity data calculated from image data of the region are compared with dictionary data, which are feature quantity data previously calculated concerning an image searched for, thereby evaluating a degree of matching. HOG (Histogram of Oriented Gradients) has been known as an algorithm for extracting feature quantities in such time. In HOG, an image is divided into blocks; a brightness gradient direction and a concentration gradient are calculated to create a histogram.

SUMMARY

The inventor made a study on the image recognition process like this and consequently, found that there is still another new problem as described below.

An image recognition process for searching for a target object includes setting regions of interest in one image plane (e.g. one frame or field) of a taken image, collating feature quantities calculated from the regions of interest with dictionary data to calculate evaluation values and thus, evaluating their degrees of matching with an image searched for. Specifically, the image process like this is achieved by two implementation embodiments as described below.

In the first implementation embodiment, feature quantities for regions of interest are calculated in turn while the regions of interest in an image plane are scanned, and the feature quantities are substituted into an evaluation function together with dictionary data, whereby evaluation values are calculated. Then, a region of interest having an evaluation value over a predetermined threshold is extracted as an image including the image searched for. During this process, a very large quantity of operations is required for calculating the feature quantities, which can interfere with the whole performance. On the other hand, in the second implementation embodiment, an image plane of a taken image is divided into blocks; feature quantities are previously calculated and kept in a memory in blocks concerning the entire image plane. The arrangement like this makes possible to keep down the quantity of operations for calculating feature quantities, but needs a remarkably large memory capacity for storing the feature quantities thus calculated.

As described above, to solve both of the following problems proved to be key: suppressing the increase in the quantity of operations for calculating feature quantities; and keeping down the storage capacity of a memory for storing calculated feature quantities.

The means for solving the problems will be described below, although another problem and novel features thereof will become clear from the description hereof and the accompanying diagrams.

According to one embodiment, such means is as follows.

An image recognition method includes setting regions of interest in an image of one image plane, and searching for a region including a recognition-targeted image, and is configured as described below.

Blocks each composed of pixels are defined. The image recognition method involves dictionary data including feature quantities respectively calculated from blocks forming a recognition-targeted region corresponding to the recognition-targeted region including the recognition-targeted image and composed of blocks. Each of regions of interest is composed of blocks of which the number is the same as the number of blocks forming the recognition-targeted region.

The image recognition method includes: calculating feature quantities for each of blocks in one image plane, which make block-of-interest feature quantities; accumulatively adding, for each of regions of interest including a block concerned, a score calculated from feature quantities calculated from a block corresponding to the block concerned in the dictionary data, and the block-of-interest feature quantities into intermediate data of an evaluation value for the region of interest; and making determination about whether or not each region of interest includes the recognition-targeted image based on an evaluation value of the region of interest on which the accumulative addition has been finished on all of blocks forming the region of interest.

The effect achieved by the above embodiment will be briefly described below.

The increase in the quantity of operations for calculating feature quantities can be suppressed, and the storage capacity of a memory for storing the feature quantities thus calculated can be kept down.

BRIEF DESCRIPTION OF THE DRAWINGS

FIG. 12 is an explanatory diagram showing the examples of numerical values of parameters involved in feature quantity extraction by HOG;

FIG. 14 is an explanatory diagram showing examples of numerical values of various parameters on condition that HOG is implemented;

FIG. 15 is an explanatory diagram showing results of evaluation concerning the number of operations, the data capacity (storage capacity or quantity of transmission) according to the methods;

FIG. 19 is an explanatory diagram for comparison of APIs when implementing image recognition processes based on the respective methods by means of a software program;

DETAILED DESCRIPTION

Prior to the detailed description concerning the embodiments, "Problem to be solved by the invention" will be described further in detail. The descriptions are presented while citing: an image recognition-processing method (comparative example 1) based on creation of a feature quantity map as an example according to the first implementation embodiment; and an image recognition-processing method (comparative example 2) based on feature quantity creation in regions of interest as an example according to the second implementation embodiment, respectively.

Figure 1:
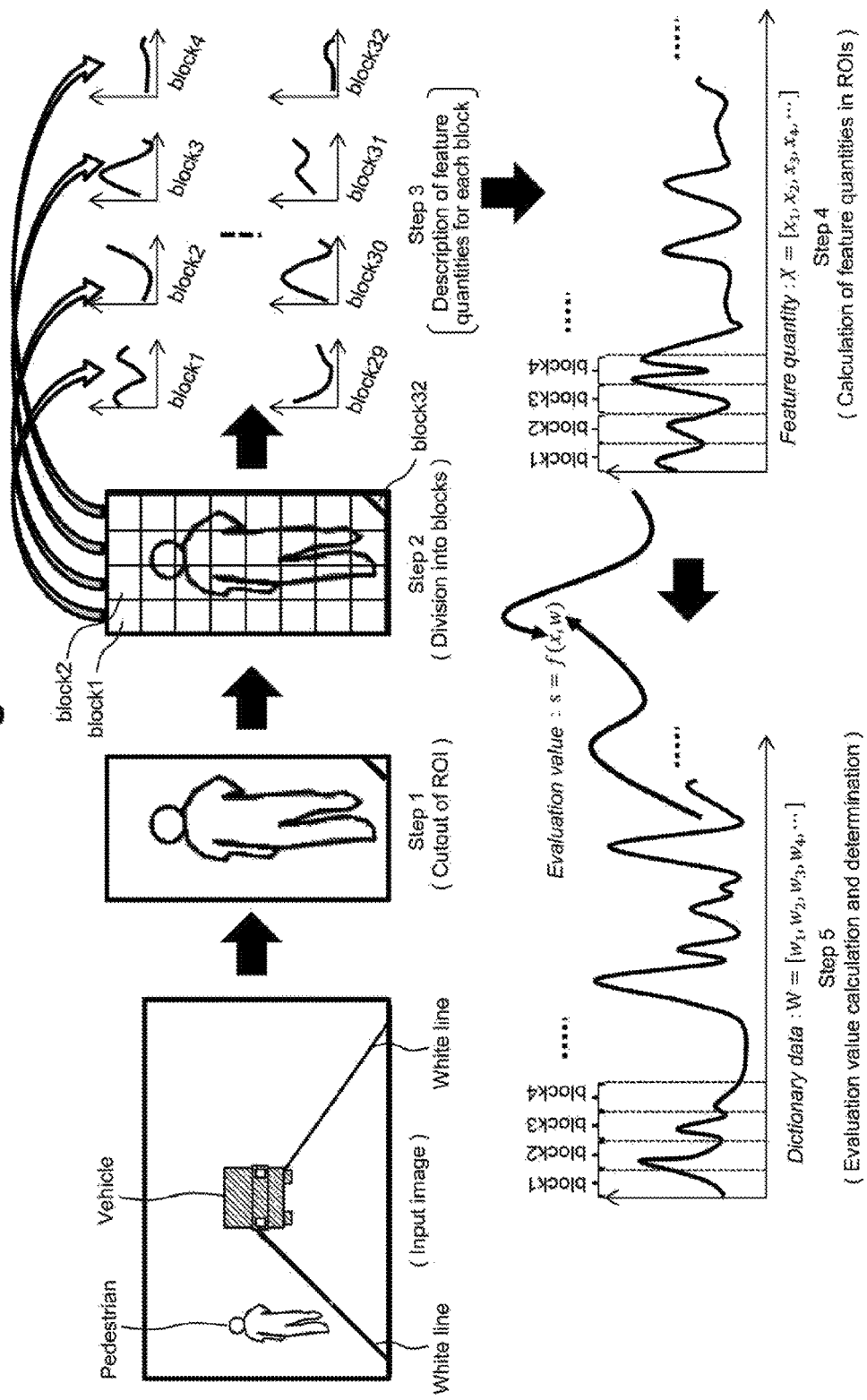
FIG. 1 is an explanatory diagram schematically showing the flow of an image recognition process.

FIG. 1 is an explanatory diagram schematically showing the flow of an image recognition process. First, an image (input image) of one image plane (e.g. one frame or field) photographed is input. The input image is a one-frame image that a moving picture image photographed by e.g. an on-vehicle camera includes, which is drawn on the basis that white lines showing both sides of a roadway, a vehicle and a pedestrian are photographed. In the image recognition process, ROI (Region Of Interest) is set in turn in one image plane of an input image; an assay is made on whether or not a recognition target is present in each region of interest. ROI is set more than once in the form of scanning the input image. In other words, more than one ROI is set in turn. Dictionary data are prepared corresponding to images of recognition targets. The dictionary data can be obtained through e.g. mechanical learning in advance. In the image recognition process, ROI set in an input image is cut out (step 1); and ROI thus cut out is divided into blocks (step 2). The block described here refers to a region composed of pixels adjacent to each other. For instance, one block is a region of 8×8 pixels; one ROI is divided into a total of 32 blocks composed of 4 horizontal blocks×8 vertical blocks. Subsequently, feature quantities are described for each block (step 3); and feature quantities X are calculated in regions of interest (ROIs) (step 4). Incidentally, the feature quantities X are made up of n elements ($x_1, x_2, \ldots, x_n$) (n is a positive integer), which are calculated by use of e.g. a feature quantity extraction algorithm, such as HOG. On the other hand, dictionary data are made up of n elements ($w_1, w_2, \ldots, w_n$) as are the feature quantities. In an assay process, feature quantities X in ROIs and dictionary data W are substituted into an evaluation function $f(x, w)$ to calculate an evaluation value (score) s and then, determination is made on whether or not a recognition target is present in ROI (step 5).

Figure 2:
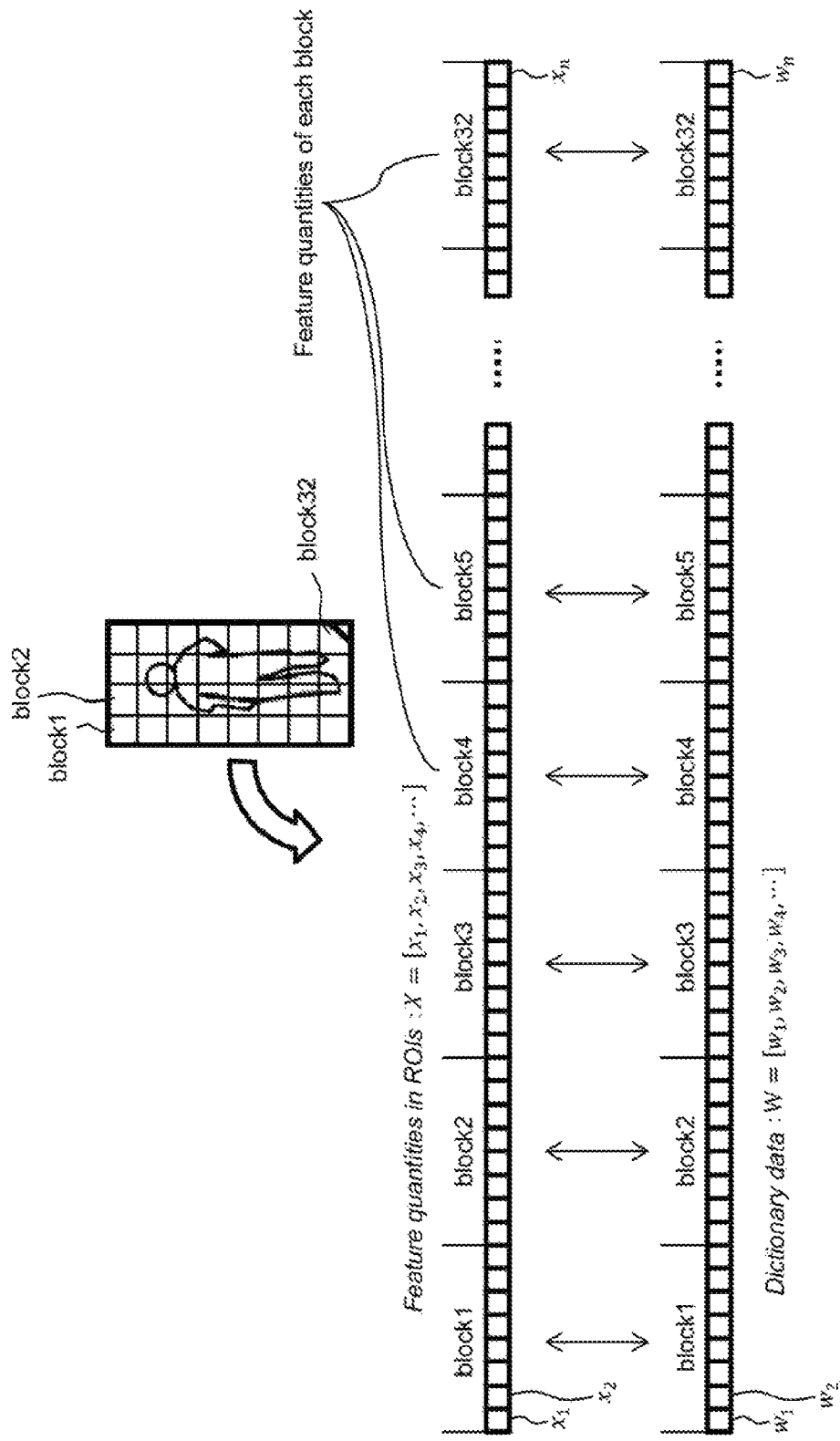
FIG. 2 is an explanatory diagram schematically showing the correspondence between feature quantities and dictionary data.

FIG. 2 is an explanatory diagram schematically showing the correspondence between feature quantities and dictionary data. The number of elements of previously prepared dictionary data W ($w_1, w_2, \ldots, w_n$) is the same as the number of elements of feature quantity data X ($x_1, x_2, \ldots, x_n$) in ROIs, which are calculated for each region of interest (ROI) set in turn. If an image made a recognition target is included in a region defined by i horizontal blocks×j vertical blocks ("i" and "j" are positive integers respectively) and dictionary data W ($w_1, w_2, \ldots, w_n$) for the region have been ready, the region of interest (ROI) is regarded as a region defined by the same i horizontal blocks×j vertical blocks. That is, the feature quantity data and dictionary data are data arranged by linking values calculated based on image data of each block in ROI; respective elements of feature quantity data X ($x_1, x_2, \ldots, x_n$) in ROIs are in one-to-one correspondence with respective elements of dictionary data W ($w_1, w_2, \ldots, w_n$). If the evaluation function is a linear SVM (Support Vector Machine), inner products are calculated in a data array order, which are offered in the form of an evaluation value $s=f(x, w)$.

Figure 3:
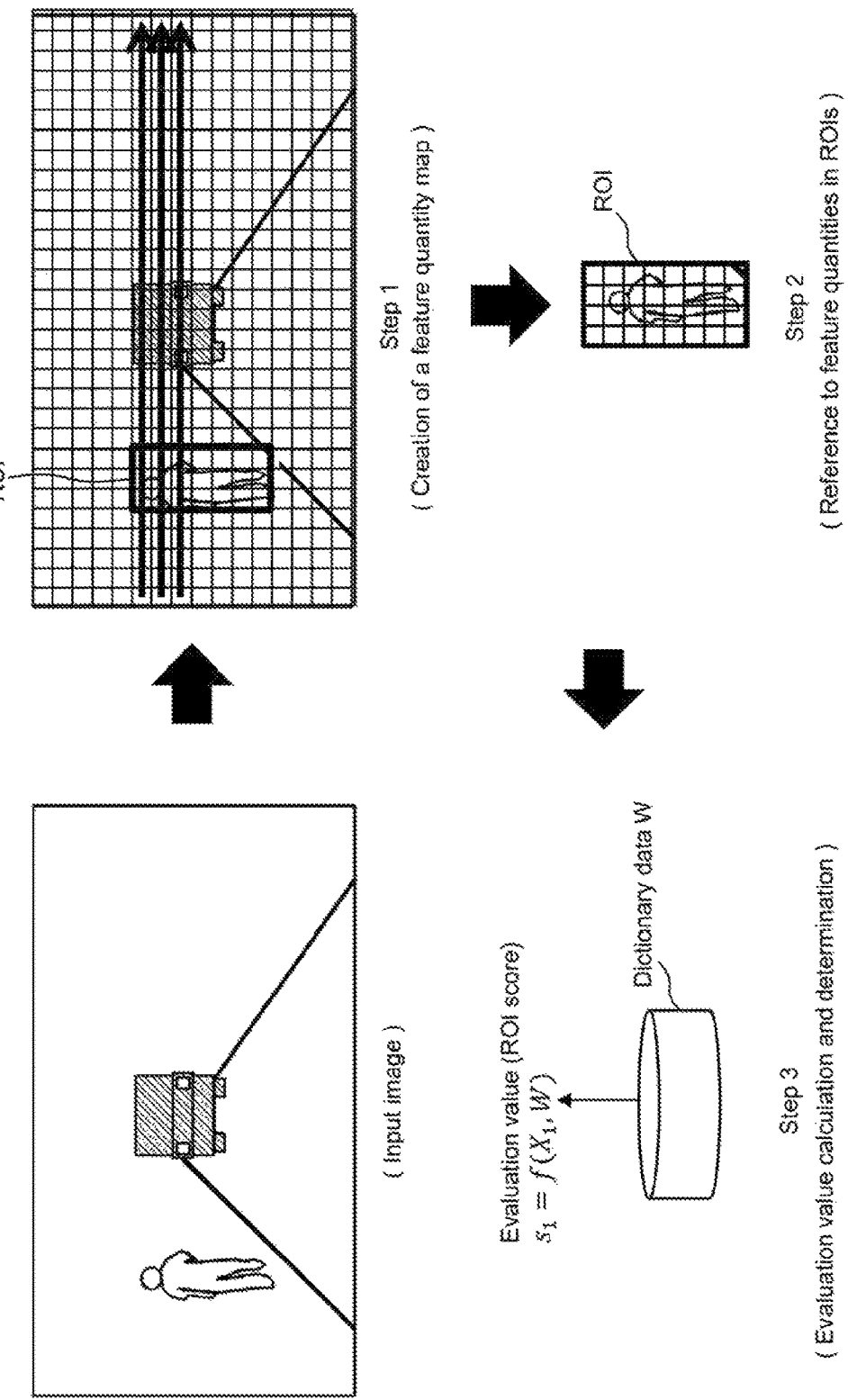
FIG. 3 is an explanatory diagram schematically showing the flow of an image recognition-processing method (comparative example 1) based on feature quantity map creation.

FIG. 3 is an explanatory diagram schematically showing the flow of an image recognition-processing method (comparative example 1) based on feature quantity map creation. In the implementation embodiment of the comparative example 1, an entire input image is divided into blocks; and feature quantities are calculated for each block to create a feature quantity map (step 1). Then, a range corresponding to ROI set within the input image is selected from the feature quantity map thus created; reference is made to feature quantities of each block in the range, thereby producing feature quantity data X1 in regions of interest (ROIs) (step 2). Then, the feature quantities X1 in ROIs and dictionary data W are substituted into the evaluation function $f(x_1, w)$ to calculate evaluation values (ROI score) s1, whereby determination on whether or not a recognition target is present in ROI is performed (step 3). An example of the evaluation function for calculating such evaluation values s1 is shown below.

$$s = f(x, w) = \sum_{i=1}^{n} (x_i \times w_i)$$

The evaluation values s1 are calculated as values of inner products of feature quantity data X and dictionary data W, as given by the above formula, for example.

Figure 4:
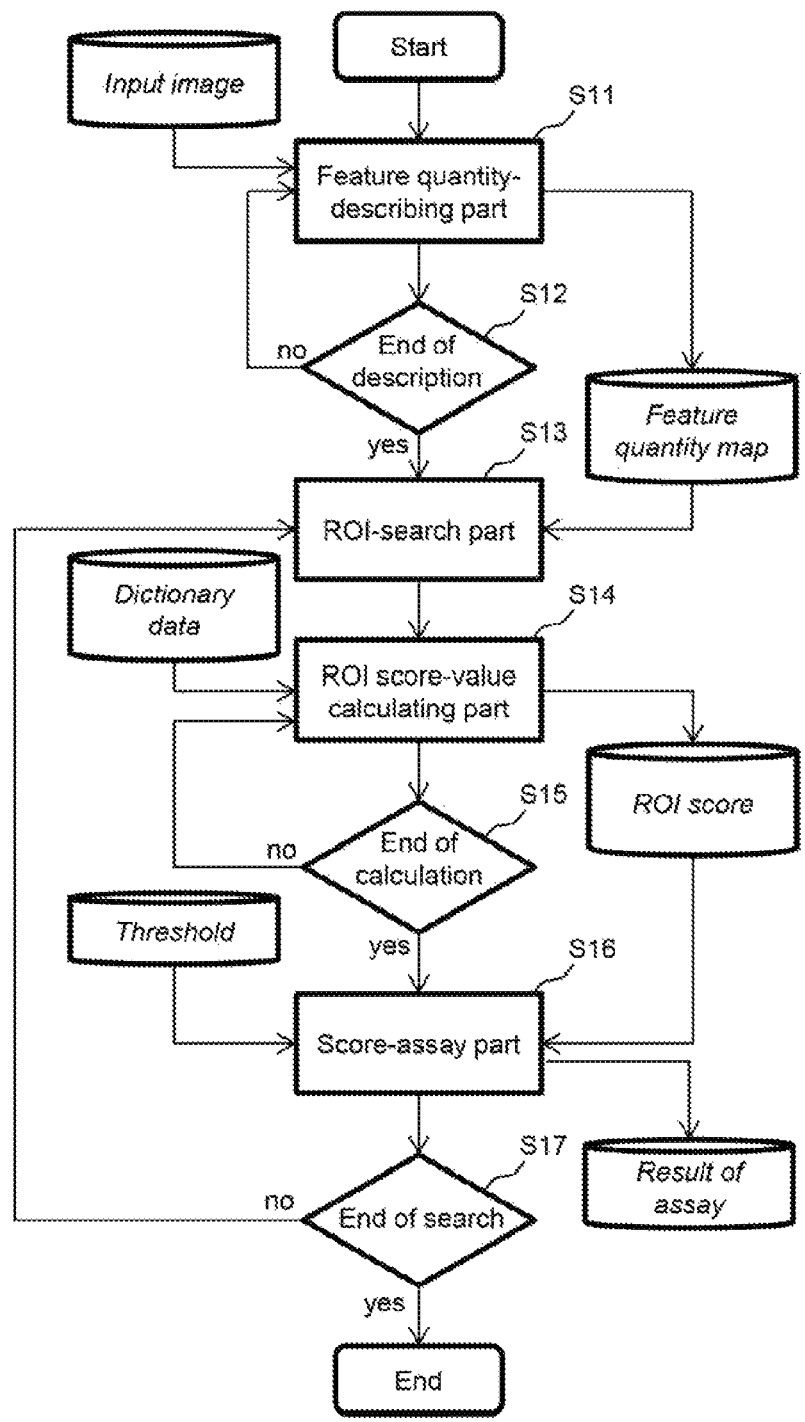
FIG. 4 is a flow chart of the image recognition-processing method (comparative example 1) based on feature quantity map creation.

FIG. 4 is a flow chart in connection with the comparative example 1. An input image, a feature quantity map, dictionary data, ROI score, a threshold, and a result of assay are input/output or intermediate generation data, which are recorded in a memory (ROM: Read Only Memory or RAM: Random Access Memory) in a computer. A processor such as CPU (Central Processing Unit) executes programs held in ROM or RAM, thereby achieving the functions of a feature quantity-describing part S11, an ROI-search part S13, an ROI score-value calculating part S14, and a score-assay part S16. First, in the feature quantity-describing part S11, feature quantities of each block are determined from brightness data of the input image with an algorithm such as HOG and saved in a feature quantity map, which is repeated until the description of feature quantities concerning all the blocks in the input image is completed (S12). Therefore, the feature quantity ends up holding feature quantity data of ROIs of the whole input image in the feature quantity map, since the feature quantity data of each ROI is a link of feature quantities of blocks forming the ROI. Then, in the ROI-search part S13, an ROI targeted for assay is selected from the feature quantity map, and feature quantity data thereof is passed to the ROI score-value calculating part S14. The ROI score-value calculating part S14 receives dictionary data and a piece of selected ROI feature quantity data from the score-search part S13, and saves a result of calculation as ROI score. The ROI score is an evaluation value for evaluating the degree of matching of ROI feature quantity data with dictionary data, which is calculated by e.g. the mathematical expression exemplified by the above formula. The score-assay part S16 accepts, as inputs, the ROI score thus calculated and the threshold, performs an assay on whether or not a recognition-targeted image is present in the selected ROI and then, saves and records a result of the assay in the memory. The same process is repeated on the subsequent ROI in the input image (S17). In this way, the assay is performed on the whole image plane of the input image.

Figure 5:
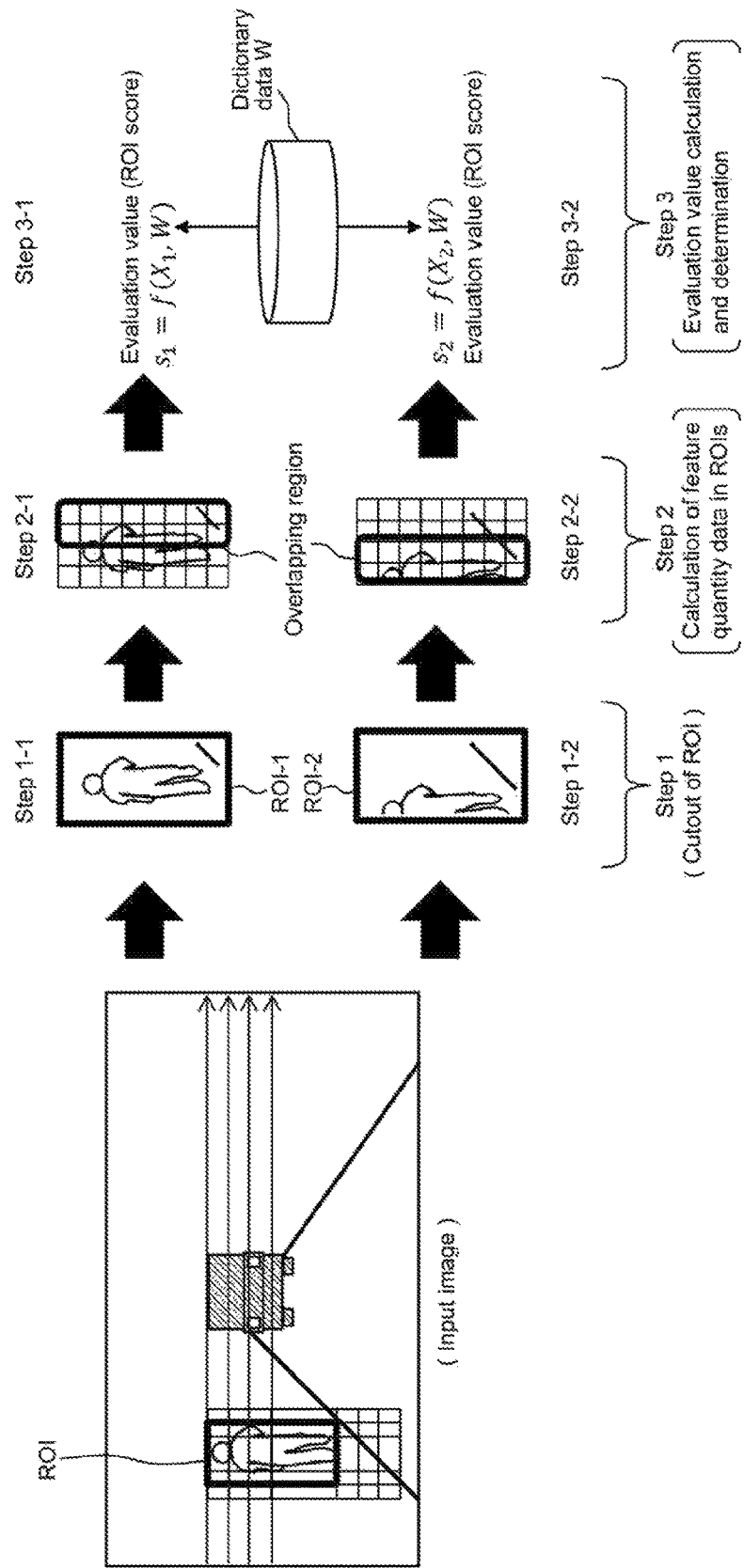
FIG. 5 is an explanatory diagram schematically showing the flow of an image recognition-processing method (comparative example 2) based on feature quantity creation in regions of interest.

FIG. 5 is an explanatory diagram schematically showing the flow of an image recognition-processing method (comparative example 2) based on feature quantity creation in regions of interest (ROIs). In the implementation embodiment of the comparative example 2, ROI targeted for assay is set in the input image, first. ROI is sequentially set in such a way as to scan the image plane of the input image. The case that a region ROI-1 of interest is set (step 1-1), and the case that a region ROI-2 of interest is set (step 1-2) are shown in FIG. 5. On condition that the region ROI-1 is set (step 1-1), the region is divided into blocks; feature quantities of each block are calculated and linked, thereby determining feature quantity data X1 (x11, x12, ..., x1n) (step 2-1). Then, the feature quantity X1 of each ROI and dictionary data W are substituted into the evaluation function f (x1, w) to calculate an evaluation value (ROI score) s1; determination is made on whether or not a recognition target is present in ROI-1 (step 3-1). After that, on condition that the region ROI-2 is set as a subsequent search target (step 1-2), the region is divided into blocks; and feature quantities are calculated and linked for each block, thereby determining feature quantity data X2 (x21, x22, ..., x2n) (step 2-2). Then, a feature quantity X2 of each ROI and dictionary data W are substituted into the evaluation function f (x2, w) to calculate an evaluation value (ROI score) s2; determination is made on whether or not the recognition target is present in ROI-2 (step 3-2).

Figure 6:
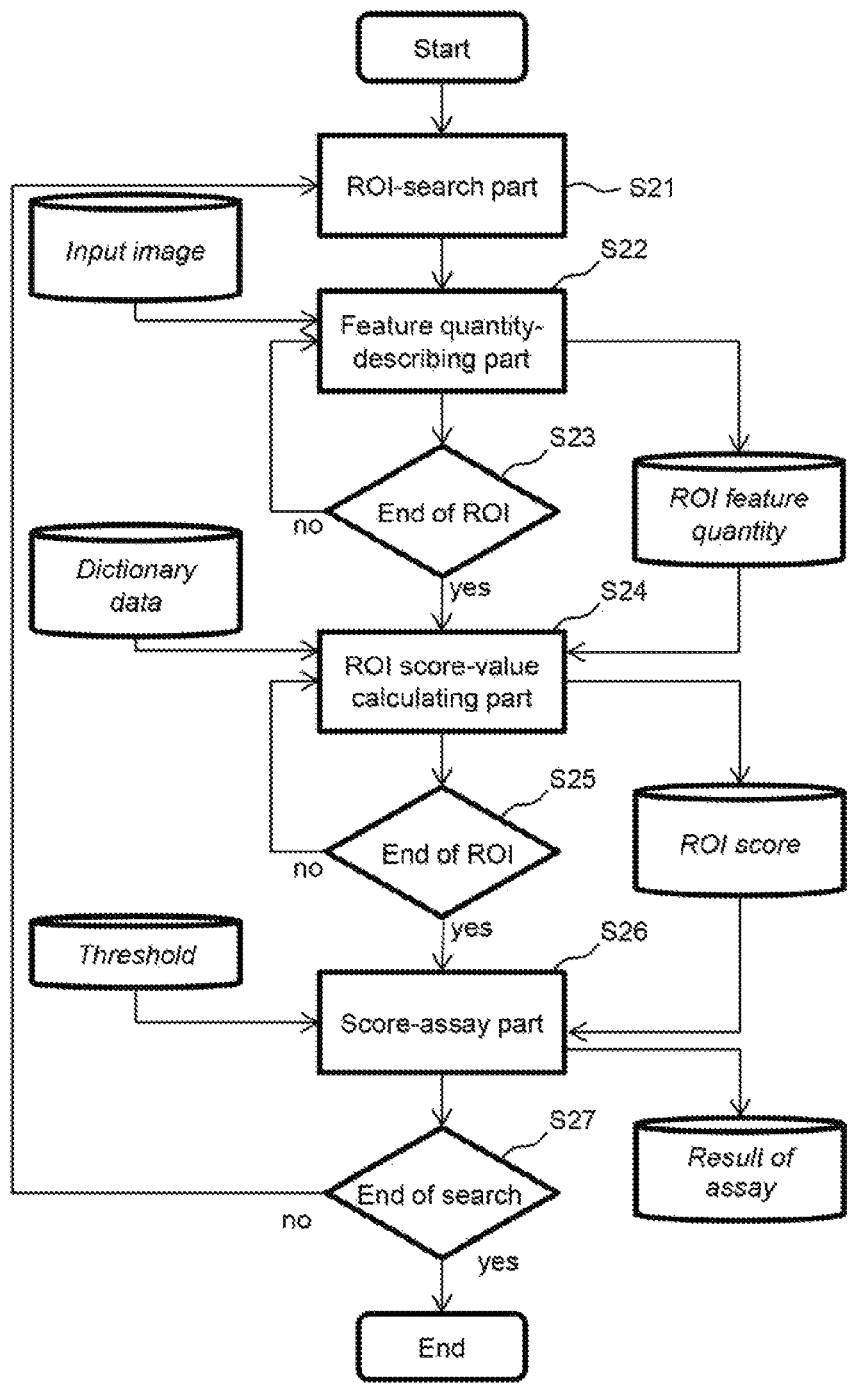
FIG. 6 is a flow chart of the image recognition-processing method (comparative example 2) based on feature quantity creation in regions of interest.

FIG. 6 is a flow chart in connection with the comparative example 2. An input image, ROI feature quantities, dictionary data, ROI score, a threshold, a result of assay are input/output or intermediate generation data, which are recorded in a memory in a computer. A processor such as CPU executes programs held in ROM or RAM, thereby achieving the functions of an ROI-search part S21, a feature quantity-describing part S22, an ROI score-value calculating part S24, and a score-assay part S26. First, the ROI-search part S21 selects an ROI targeted for assay from the input image; and image data of the selected region are input to the feature quantity-describing part S22. Subsequently, the feature quantity-describing part S22 repeats the calculation of a feature quantity of a block included in the selected ROI (S23), thereby creating feature quantity data in ROIs and saving them as ROI feature quantities. The ROI score-value calculating part S24 receives ROI feature quantities and dictionary data and saves a result of calculation as an ROI score. The ROI score is an evaluation value for evaluating the degree of matching of ROI feature quantity data with the dictionary data, which is calculated by e.g. the mathematical expression exemplified by the above formula. The score-assay part S26 accepts, as inputs, the derived ROI score and the threshold, performs assay on whether or not a recognition-targeted image is present in the selected ROI and then, saves and records a result of the assay in the memory. The same process is repeated on the subsequent ROI in the input image (S27). In this way, the assay is performed on the whole image plane of the input image.

As described above, the image recognition-processing method based on feature quantity map creation (comparative example 1), which has been described with reference to FIGS. 3 and 4 is large in a memory size for saving "feature quantity map" created as intermediate data, so a work memory with a large capacity is required. Mounting a work memory on LSI (Large Scale Integrated circuit) in "On-Chip" manner in light of this, the chip area is remarkably increased, and the chip cost is raised. Alternatively, in the case of using an external memory as the work memory, and saving intermediate data therein, an extra transmission cycle is required for external access, which ends up remarkably increasing a length of time required for an image-recognizing operation. On the other hand, the image recognition-processing method based on feature quantity creating in regions of interest (ROIs) (comparative example 2), which has been described with reference to FIGS. 5 and 6, is a method for searching an entire image arranged so that whenever ROI is selected, feature quantity calculation is performed on the selected ROI unlike the image recognition-processing method of the comparative example 1, by which a feature quantity-calculating process is performed collectively on an entire input image in advance. Therefore, the image recognition-processing method of the comparative example 2 is characterized in that a large volume of intermediate data is never produced, and the memory capacity or the quantity of data transmission can be kept down. However, image regions of ROIs partially overlap with each other (see FIG. 5); in the search, feature quantity calculation is performed on blocks of the overlapping region more than once, which is redundant and leads to the increase in processing time.

For instance, an image recognition process of ADAS (Advanced Driving Assistant System) or the like needs a real-time action with a limited hardware resource. So, keeping down the volume of intermediate data to be stored in a work memory and omitting a redundant operation are both required.

Now, the detailed description on the embodiments will be presented. In all the diagrams for describing the embodiments of the invention, like constituents or parts identical in function to each other are identified by the same reference characters or symbols, and the repetition of their descriptions is omitted.

[First Embodiment]

To solve the above problems, the first embodiment is arranged, turning to blocks forming a region of interest (ROI). As shown in FIG. 2, one ROI is constituted by blocks identical in size to each other. Feature quantities in ROIs are derived by linking feature quantities of each block according to a previously defined order. Now, it is noted that feature quantities of each block form an array of tens to hundreds data; feature quantity data in ROIs form an array of one hundred to more than one thousand data, of which the number represents the number of data of feature quantities of each block multiplied by the number of blocks of ROI. A "feature quantity map" created by the above-described image recognition-processing method based on feature quantity map creation (comparative example 1) is a data array of such block feature quantity data into which data of an entire input image are converted. The first embodiment is a method for saving, as intermediate data, not such a feature quantity map, but scores (scalar values) derived for blocks in the form of a score map in ROIs.

Figure 7:
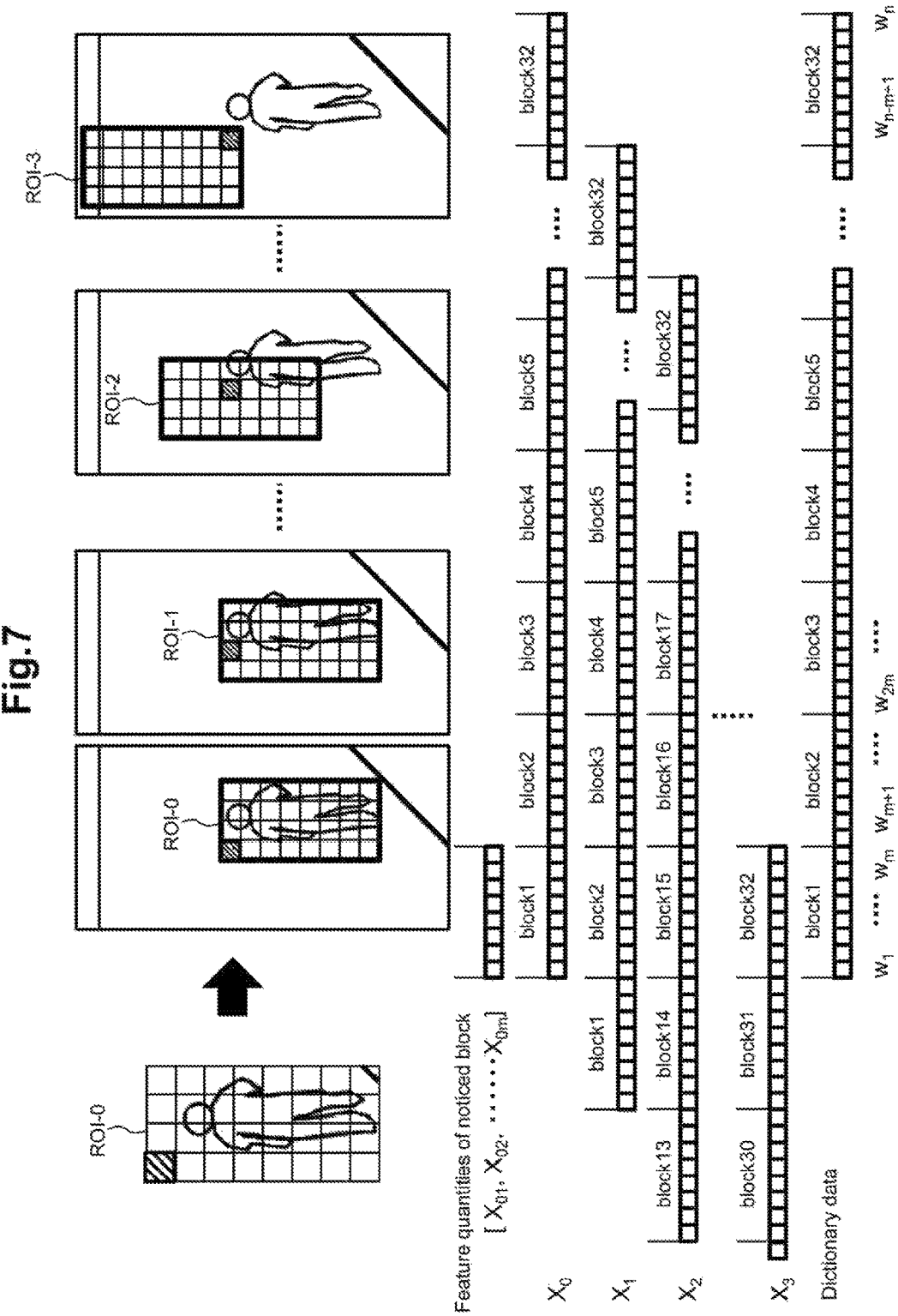
FIG. 7 is an explanatory diagram schematically showing a method for calculating block scores which are intermediate data for calculating evaluation values (ROI scores)

FIG. 7 is an explanatory diagram schematically showing a method for calculating a block score used as intermediate data for calculating an evaluation value (ROI score). The relation between feature quantity data of selected ROI and feature quantity data of a peripheral ROI is shown in the diagram. ROI is constituted by a total 32 blocks of 8 vertical blocks×4 horizontal blocks. Specifically, ROI is formed by a first block block1, a second block block2, . . . , a 32-th block block32 from the upper left portion in a row direction and then, in a column direction in turn. The feature quantities of each block are constituted by an array of m data; feature quantity data of ROI is constituted by a link of feature quantities of all of blocks forming the ROI, the number of which is a total of n=32m. The number of dictionary data W (w1, w2, . . . , wn) is the same as it; a group of elements w1, w2, . . . , wm corresponds to the first block block1, the next group of elements wm+1, wm+2, . . . , w2m corresponds to the second block block2, subsequent groups of elements correspond to the subsequent blocks in turn in the same way, and the last group of elements wn−m+1, wn−m+2, . . . , wn corresponds to the 32-th block block32.

Now, it is supposed that a region of interest, which is noticed, is ROI-0, and attention is paid to the upper left block (first block block1) in the region ROI-0. Then, the feature quantities of the block (noticed block) are represented by (x01, x02, . . . , x0m). In the region ROI-0, the noticed block is the first block block1 and as such, the feature quantities of the first block are linked in association with the position of block1 in feature quantity data X0 of the region ROI-0. Therefore, the feature quantity data X0 is represented by: X0=(x01, x02, . . . , x0m, xm+1, xm+2, . . . , x2m, . . . , xn). In such a situation, the feature quantities (x01, x02, . . . , x0m) of the noticed block are calculated and in addition, the calculation of an evaluation value (ROI score) for ROI-0 is started. The evaluation value (ROI score) of ROI-0 is expressed by the formula below.

$$s0 = x_{01} \times w_1 + x_{02} \times w_2 + \ldots + x_{0m} \times w_m + x_{m+1} \times w_{m+1} + \ldots + x_{2m} \times w_{2m} + \ldots + x_n \times w_n$$

In the above formula, only the terms in connection with the noticed block are calculated by the formula below, whereby a block score (blkscore) is obtained.

$$\text{blkscore0} = x_{01} \times w_1 + x_{02} \times w_2 + \ldots + x_{0m} \times w_m$$

The evaluation value (ROI score) can be calculated in the form of a sum total of block scores (blkscores) of all the blocks forming ROI.

Another region ROI located around the region ROI-0 includes a noticed block. For instance, it is supposed that the second block of ROI-1, the 15-th block of ROI-2 and the 32-th block of ROI-3 are noticed blocks. In calculating feature quantities (x01, x02, . . . , x0m) of the noticed block, the calculation of an evaluation value (ROI score) of ROI-0 is started and in addition, evaluation values (ROI scores) of other peripheral ROIs are calculated as described above. Specifically, as to the region ROI-1, feature quantities of the second block block2 make feature quantities (x01, x02, . . . , x0m) of the noticed block; and the inner products of the feature quantities and a data array corresponding to the second block in dictionary data are taken to calculate a block score, which is accumulatively added to already calculated intermediate data as part of the ROI score of ROI-1. Likewise, with the region ROI-2, feature quantities of the 15-th block block15 make feature quantities (x01, x02, . . . , x0m) of the noticed block; and the inner products of the feature quantities and a data array corresponding to the 15-th block in dictionary data are taken to calculate a block score, which is accumulatively added to already calculated intermediate data as part of the ROI score of ROI-2. Further, as to the region ROI-3, feature quantities of the 32-th block block32 make feature quantities (x01, x02, . . . , x0m) of the noticed block; and the inner products of the feature quantities and a data array corresponding to the 32-th block in dictionary data are taken to calculate a block score, which is accumulatively added to already calculated intermediate data as part of the ROI score of ROI-3.

Figure 8:
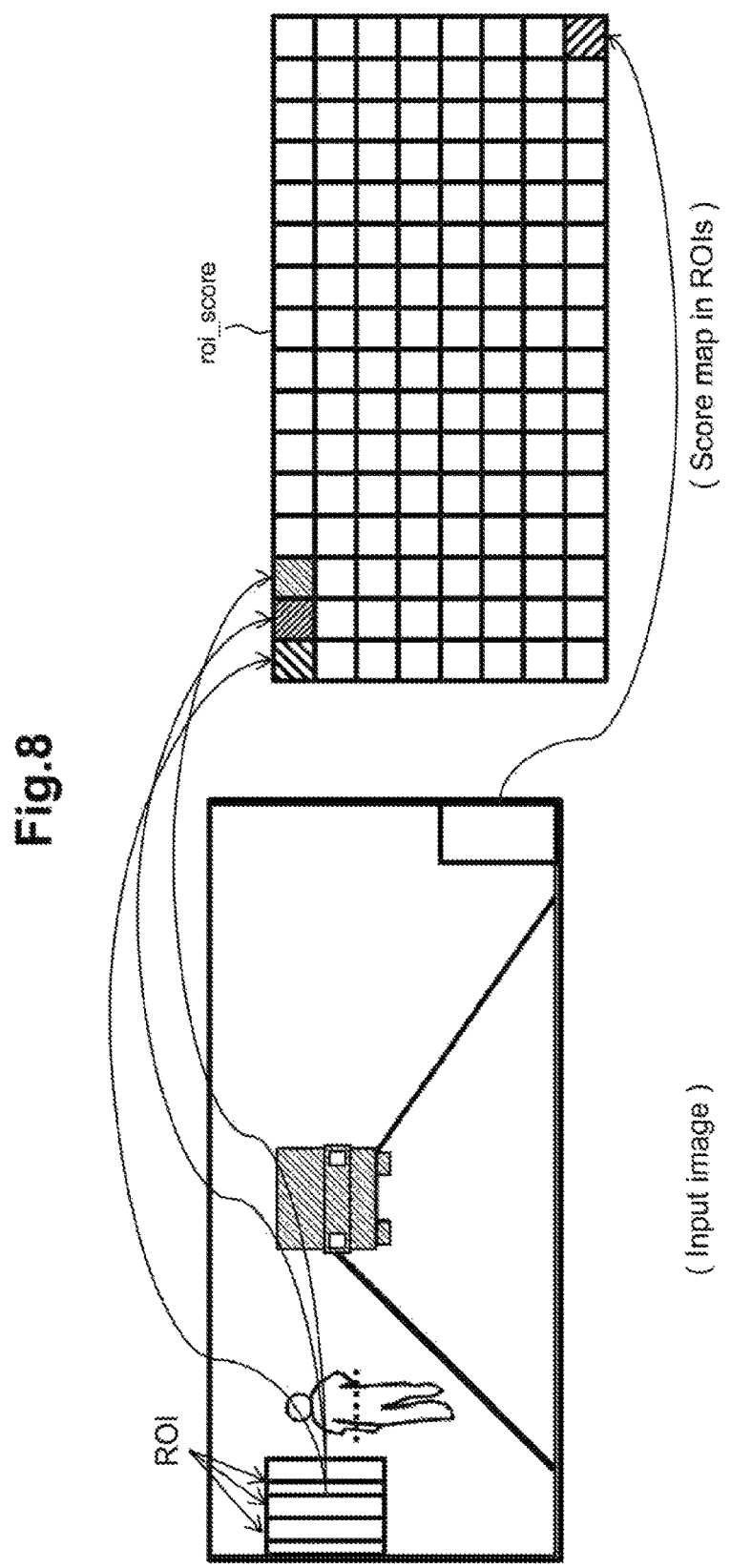
FIG. 8 is an explanatory diagram schematically showing a data format of a score map in ROIs for keeping ROI score intermediate data.

FIG. 8 is an explanatory diagram schematically showing a data format of a score map in ROIs for keeping ROI score intermediate data. In the score map in ROIs (roi_score), one intermediate data memory region is allocated to each ROI in regard to all of ROIs in an image plane of an input image, which is illustrated by a number of ROIs in a horizontal direction and a number of ROIs in a vertical direction in one image plane of the input image in two dimensions in FIG. 8. Such intermediate data memory regions may be arranged in two or one dimensional arrays on a program. As described above, block feature quantities are generally composed of vector data constituted by about tens to more than one hundred of elements, and one ROI is constituted by about tens of block feature quantities. Therefore, a large-capacity work memory is required for saving a feature quantity map as shown in FIG. 3. In contrast, in the first embodiment, ROI scores thus generated are saved as scalar values in such a way that one scalar value is kept per ROI. In other words, updating the score map in ROIs immediately after block feature quantity creation, it becomes possible to largely reduce the quantity of intermediate data to hold.

Figure 9:
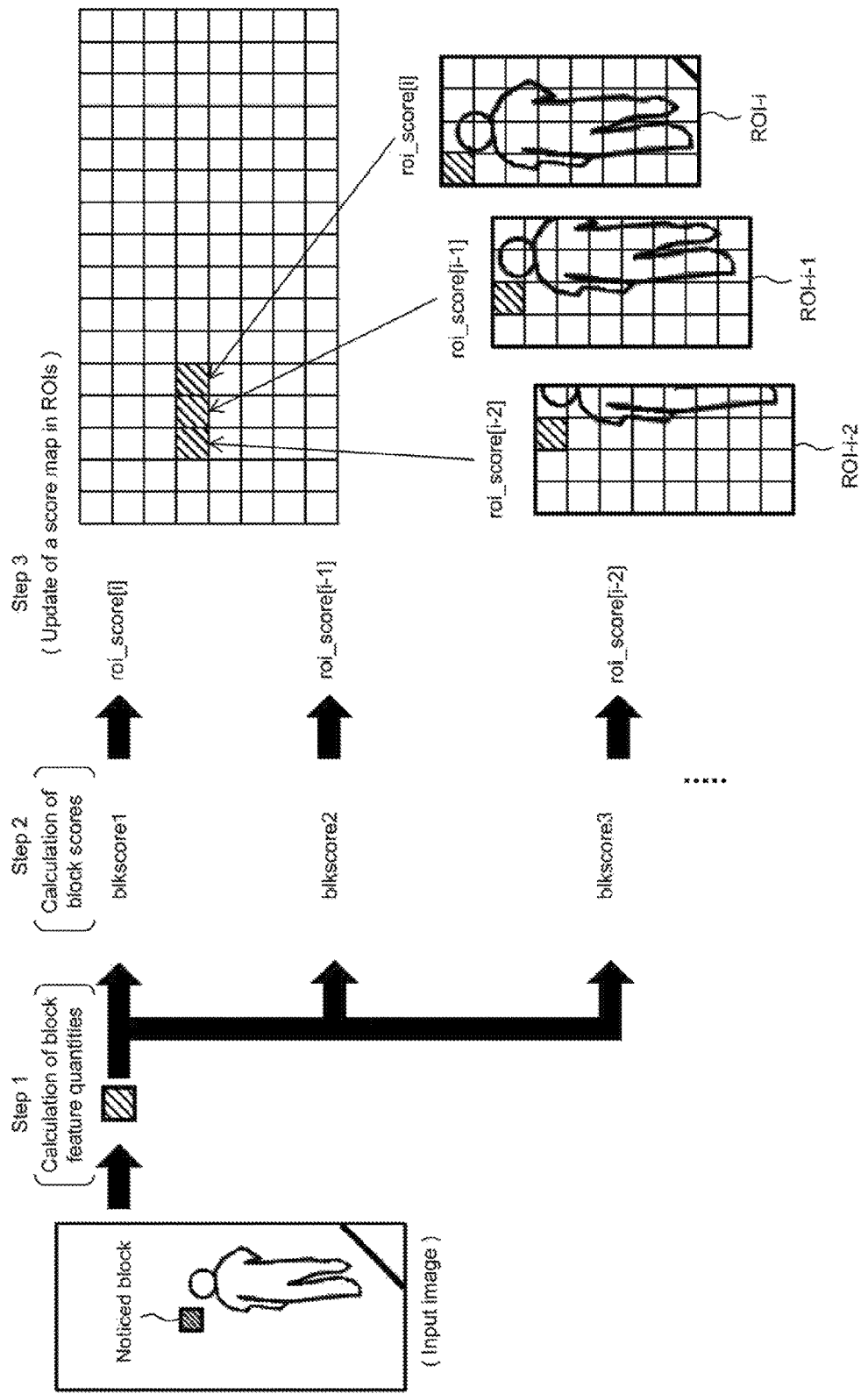
FIG. 9 is an explanatory diagram schematically showing a method for calculating a score map in ROIs.

A method for updating a score map in ROIs will be described further in detail. FIG. 9 is an explanatory diagram schematically showing a method for calculating a score map in ROIs. One block in an input image is set as a noticed block, and block feature quantities of the block are calculated (step 1). With all of ROIs including the noticed block, block scores are calculated from the block feature quantities thus calculated (step 2). The block scores are calculated according to the formula below.

$$blkscore[j] = g(\text{x\_blk}, \text{w\_blk\_j}) = \sum_{l=1}^{k} (\text{x\_blk}_l \times \text{w\_blk\_j}_l)$$

Supposing that a block feature quantity of the noticed block is x_blk, a data array corresponding to the j-th block in dictionary data is w_blk_j, and the number of blocks in ROI is k, the block score blkscore [j] is calculated as an inner product forming an element in the block.

ROI score is calculated according to the formula below.

$$\text{roi\_score}[l+k-j] \mathrel{+}= \text{blkscore}[j] (j=1, 2, 3, \ldots m)$$

An ROI coordinate offset resulting from the search is one (1), and the value of a block score is added to the roi_score accumulatively.

Supposing that the noticed block is e.g. the first block of the region ROI-i, the block score blkscore1 is calculated as the inner product of a group of calculated block feature quantities and of dictionary data, data of an array corresponding to the first block. The block score blkscore1 thus calculated is accumulatively added to intermediate data roi_score [i] corresponding to ROI-i in the score map in ROIs. If the same noticed block makes the second block of the region ROI-i–1, the block score blkscore2 is calculated as the inner product of a group of calculated block feature quantities and of dictionary data, data of an array corresponding to the second block. The block score blkscore2 thus calculated is accumulatively added to intermediate data roi_score [i–1] corresponding to the region ROI-i–1 in the score map in ROIs. Further, if the same noticed block makes the third block of the region ROI-i–2, the block score blkscore3 is calculated as the inner product of a group of calculated block feature quantities and of dictionary data, data of an array corresponding to the third block. The block score blkscore3 thus calculated is accumulatively added to intermediate data roi_score [i–2] corresponding to the region ROI-i–2 in the score map in ROIs. In the same way for the other regions of interest, the respective block scores are calculated on all of ROIs including the noticed block, which are accumulatively added to respective intermediate data corresponding to the noticed blocks concerned in the score map in ROIs.

Figure 10:
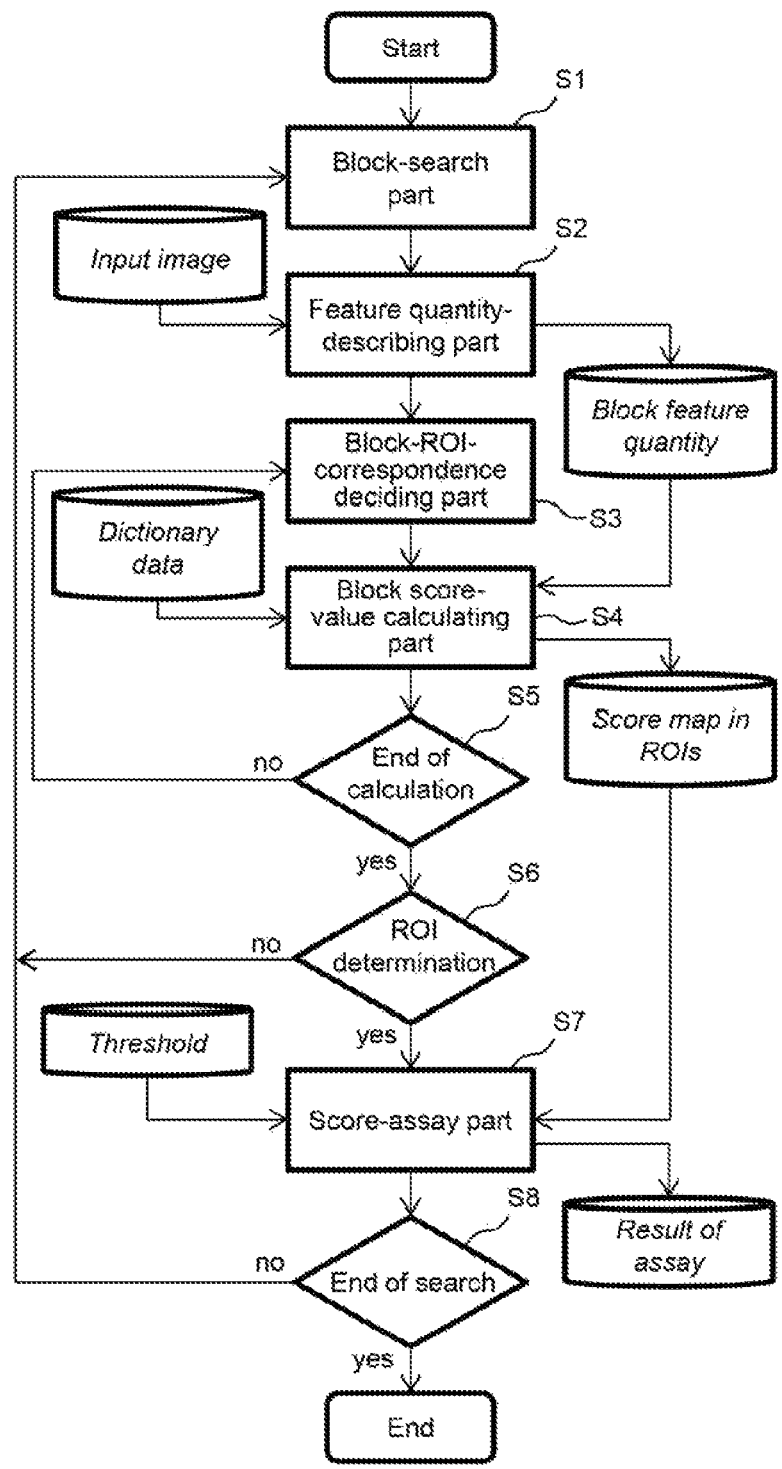
FIG. 10 is a flow chart showing an example of an image recognition process according to the first embodiment.

FIG. 10 is a flow chart showing an example of the image recognition process in connection with the first embodiment. An input image, block feature quantities, dictionary data, a score map in ROIs, a threshold, a result of assay are input/output or intermediate generation data, which are recorded in a memory in a computer. A processor such as CPU executes programs held in ROM or RAM, thereby achieving the functions of a block-search part S1, a feature quantity-describing part S2, a block-ROI-correspondence deciding part S3, a block score-value calculating part S4 and a score-assay part S7.

The block-search part S1 selects a noticed block. For instance, an input image is divided into blocks; a block sequentially selected by scanning is set to be a noticed block. While shifting the position of a block, which makes a starting point, with appropriate pitches, and scanning one input image plane more than once, noticed blocks are selected in turn. The smaller the pitches, the more the accuracy of image recognition can be increased. The capacity of intermediate data to save and the quantity of operations are raised with the increase in the accuracy of image recognition. So, the pitches are appropriately set in consideration of tradeoff, or they may be appropriately changed according to the condition of an input image, or a working environment. For instance, in a motor vehicle with the image recognition system installed thereon, the pitches may be changed between the time of high-speed running, during which it is expected that the vehicle is cruising on a highway and the time of low-speed running, during which it is expected that the vehicle is going through a crowded street or the like.

The block feature quantity-describing part S2 reads brightness data of the noticed block specified by the block-search part S1 from input data, converts the read brightness data into feature quantity data by use of an algorithm such as HOG, and saves the feature quantity data as block feature quantities. As such block feature quantities, feature quantities of a block forming a part of ROI are saved. Next, the block-ROI-correspondence deciding part S3 derives, from the block feature quantities, coordinates of ROI to refer to at the time of assay and coordinates of a noticed block in each ROI. The block score calculating part S4 receives the coordinates of the noticed block in each ROI from the block-ROI-correspondence deciding part S3, derives a block score from a corresponding data array in dictionary data, and the saved block feature quantities, and accumulatively adds the block score thus derived to the score map in ROIs. The end-of-calculation determination block S5 repeats the calculation of a block score until scores of all the blocks in ROI are added to the score map in ROIs. The ROI determination part S6 performs a determination on whether or not the score calculation for one ROI has been completed. The score-assay part S7 accepts the input of a threshold and then, performs assay on a block belonging to selected ROI such that the accumulative addition of scores of all of blocks of the ROI has been completed about whether or not a recognition-targeted image is present in the ROI. The results of the assay by the score-assay part S7 are saved in the memory and then, the same process is repeated on a subsequent block in the input image (S8), whereby the assay is performed on the entire image plane.

Figure 13:
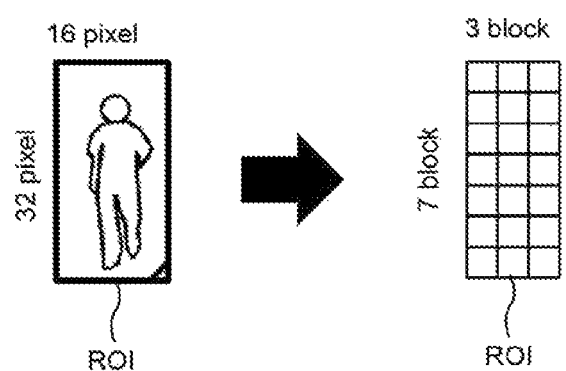
FIG. 13 is an explanatory diagram showing an example of ROI configuration.

Now, the effect of the first embodiment will be described. The image recognition-processing method based on feature quantity map creation (comparative example 1), the image recognition-processing method (comparative example 2) based on feature quantity creation in regions of interest, and the image recognition-processing method according to the first embodiment are evaluated and mutually compared in the number of operations and the data capacity (storage capacity or quantity of transmission). The algorithm for feature quantity extraction is HOG; the definition of various parameters is as described in FIG. 11; examples of numerical values of parameters in connection with the feature quantity extraction according to HOG are shown in FIG. 12; an example of the configuration of ROI is shown in FIG. 13; and examples of numerical values of the various parameters with HOG implemented are shown in FIG. 14.

Figure 11:
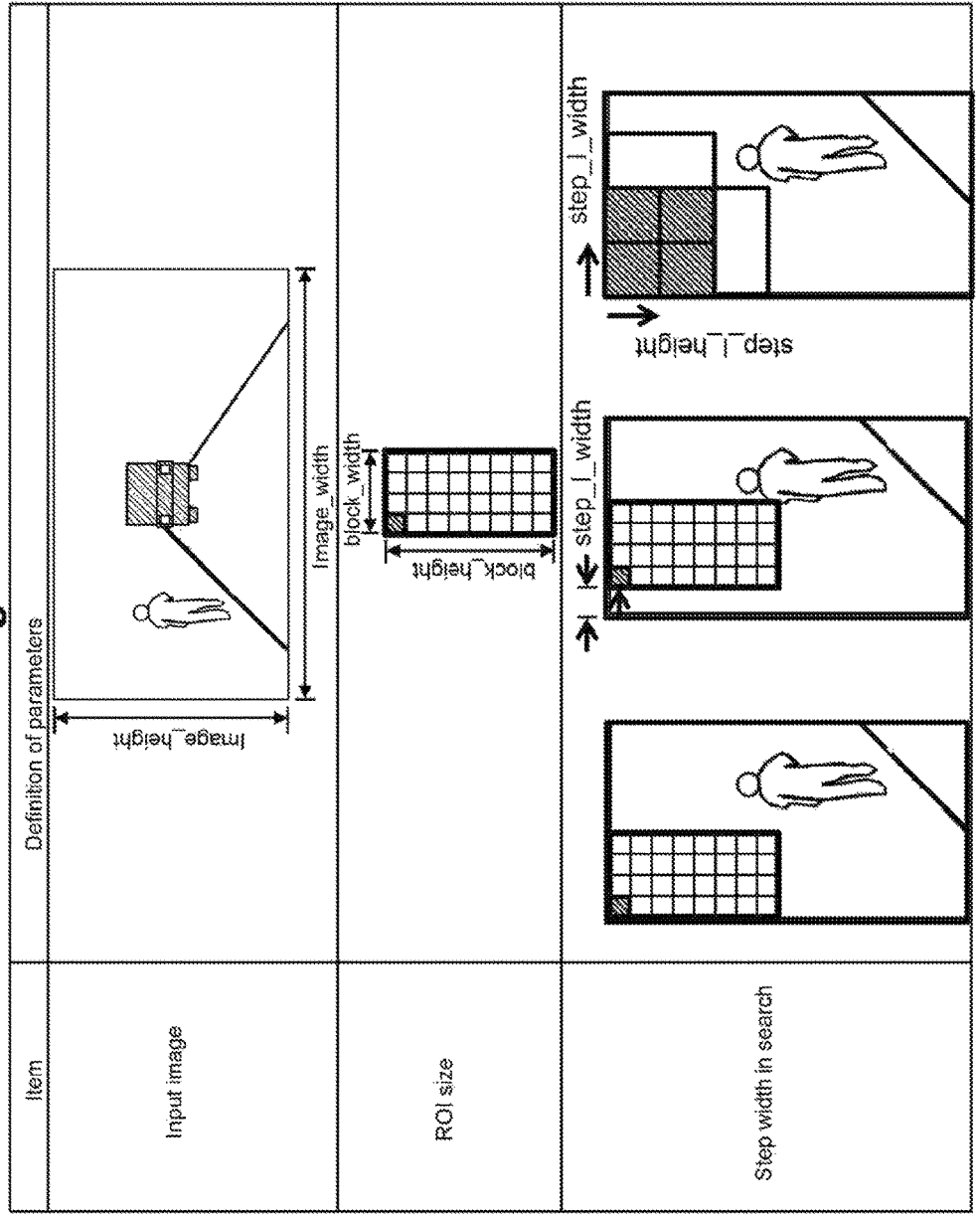
FIG. 11 is an explanatory diagram showing the definitions of various parameters.

The definition of various parameters is shown in FIG. 11. The size of the input image is represented in the form of a horizontal size Image_width×a vertical size Image_height; and the size of ROI is represented in the form of a horizontal size block_widthblock×a vetertical size block_heightblock. With step widths in search, the step width in a horizontal direction is denoted by step_I_width, and the step width in a vertical direction is denoted by step_I_height. The step widths in search are defined by e.g. a block width divided by an integer.

FIG. 12 shows the examples of numerical values of the various parameters on condition that HOG is implemented; ROI size is given by 16×32 picture elements (pixels), the cell size is given by 4×4 pixels, and the block size is given by 2×2 cells=8×8 pixels. It is supposed here that one ROI is constituted by three blocks in a horizontal direction and seven blocks in a vertical direction, as shown in FIG. 13. The size of one ROI in the horizontal direction is 16 pixels and therefore, a total of three blocks each made up of 8×8 pixels, which are disposed at intervals of four pixels in the horizontal direction, are included in ROI in the horizontal direction. Further, the size of one ROI in the vertical direction is 32 pixels and therefore, a total of seven blocks each made of 8×8 pixels, which are disposed at intervals of four pixels in the vertical direction, are included in ROI in the vertical direction. Hence, the number of blocks constituting one ROI is 21 (=3×7). Now, supposing that the gradient direction in HOG is quantized in eight directions (# of bins=8), the number of dimensions of feature quantities (feature-dimension) is 672 (=8×2×2×21).

FIG. 14 shows examples of numerical values of the various parameters on condition that HOG is implemented. An input image has a horizontal size (Image_width) of 1920 pixels and a vertical size (Image_height) of 1080 pixels; and the horizontal search step is 2, and the vertical search step is 4. In this case, the number of ROIs is 4765 in total, which is given by 953 ROIs in the row direction and 5 ROIs in the column direction. The number of blocks is 10527 in total, which is given by 957 blocks in the row direction and 11 blocks in the column direction.

FIG. 15 shows, in a table form, results of evaluation according to the image recognition-processing method (comparative example 1) based on feature quantity map creation, the image recognition-processing method (comparative example 2) based on feature quantity creation in regions of interest, and the image recognition-processing method according to the first embodiment concerning the number of operations, and the data capacity (storage capacity or quantity of transmission). In the table, the first row exemplifies structures of loops, which are described in a high-level language; the second row shows numbers of operations by the loops; the third row shows data quantities of created intermediate data; and the fourth and fifth rows show results of comparisons in the respective items among the above image recognition-processing methods.

The loops of the image recognition-processing method (comparative example 1) based on feature quantity map creation include: a double loop for feature quantity description and creation of a feature quantity map and write thereto; and a quadruple loop for feature quantity map read and score derivation. The double loop of a preceding stage is a double loop arranged so as to repeat the scan of an input image with a step width step_I_width in the horizontal direction, and a step width step_I_height in the vertical direction. The quadruple loop of the subsequent stage includes: a double loop arranged so as to repeat the scan of blocks with a step width of one pixel in the horizontal and vertical directions; and an outer double loop arranged so as to repeat the scan of an input image with the step width step_I_width in the horizontal direction and with the step width step_I_height in the vertical direction. Incidentally, the determination is performed outside the inner double loop and inside the outer double loop. As a result, the number of operations for block feature quantity creation becomes A×B; the number of operations for score derivation is A×B×C×D; and the number of operations for the determination is A×B. In addition, the quantity of generated intermediate data (a feature quantity map in the comparative example 1) is 673,728 Byte (=10527×31×2). It is noted that A=Image_height/ step_I_h; B=Image_width/step_I_w; C=Block_height; and D=Block_width.

Figure 16:
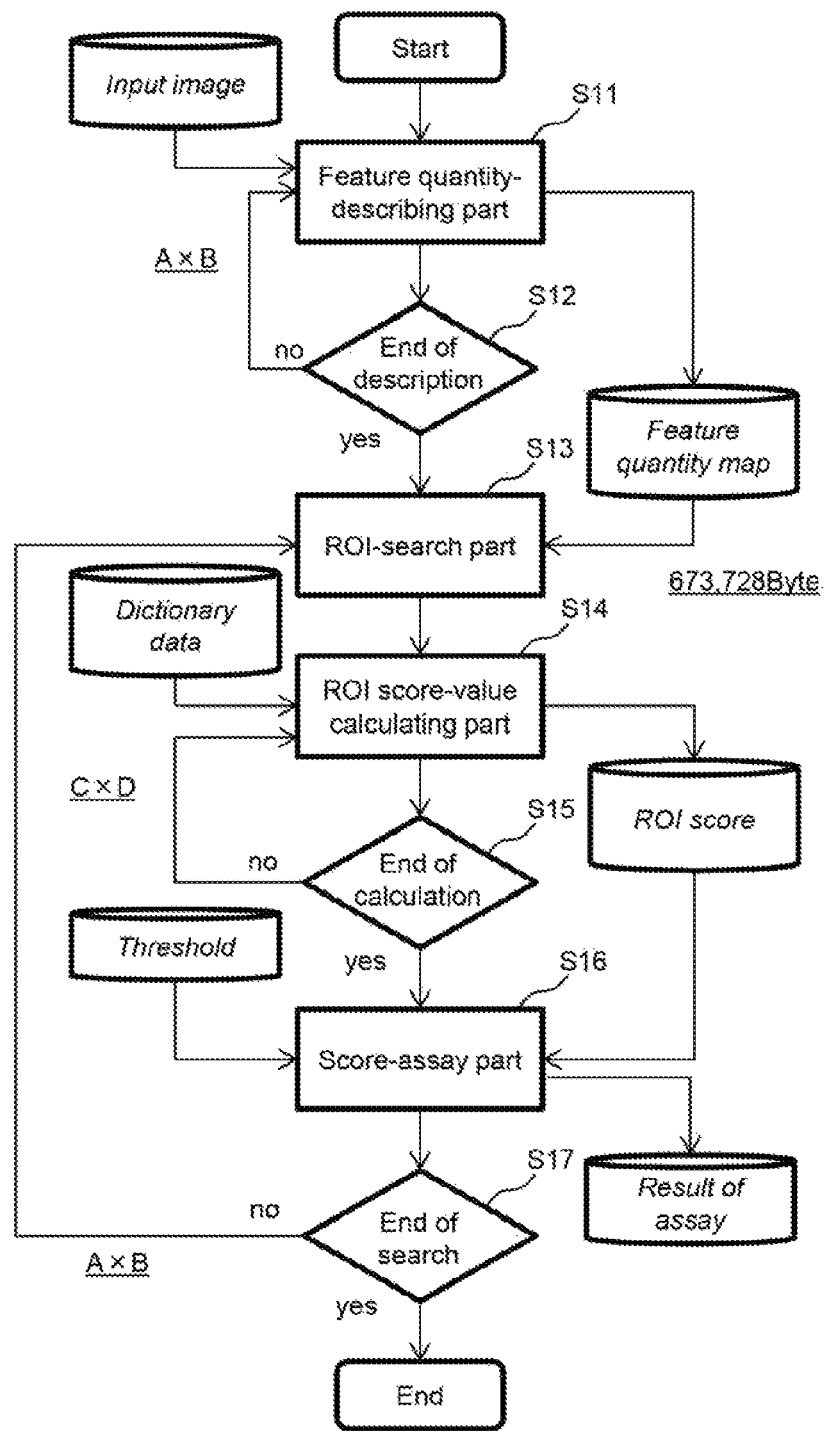
FIG. 16 is an explanatory diagram showing results of evaluation concerning the number of operations, and data capacity (storage capacity or quantity of transmission) in the flow of the image recognition-processing method (comparative example 1) based on feature quantity map creation.

FIG. 16 is an explanatory diagram showing results of evaluation concerning the number of operations, and the data capacity (storage capacity or quantity of transmission) in the flow of the image recognition-processing method (comparative example 1) based on feature quantity map creation. FIG. 16 presents the same flow chart as that of FIG. 4; the number of operations and the data capacity (storage capacity or quantity of transmission) of intermediate data are shown together. The descriptions of the respective steps are omitted here. This is because they are the same as those shown in FIG. 4. The loop including the feature quantity-describing part S11 is the double loop of the preceding stage described above; the number of operations is A×B. The loop including the ROI score calculating part S14 is the quadruple loop of the subsequent stage described above; the number of operations is A×B×C×D. The loop including the score-assay part S16 is the outer double loop of the above-described quadruple loop of the subsequent stage; the number of operations is A×B. In this method, the quantity of data representing a total block number (10,527) multiplied by the number of dimensions forming one block (which is 32 in this case) becomes required; the data capacity of the feature quantity map is 673,728 Byte on the supposition that the feature quantity per dimension is 2 Byte.

The loop of the image recognition-processing method (comparative example 2) based on feature quantity creation in regions of interest includes a quadruple loop for block feature quantity creation. The score derivation and determination are disposed outside the inner double loop included in the quadruple loop. The outer double loop is a double loop arranged so as to repeat the scan of an input image with the step width step_I_width in the horizontal direction, and with the step width step_I_height in the vertical direction. The inner double loop is a double loop arranged so as to repeat the scan of blocks with a step width of one pixel in the horizontal and vertical directions. As a result, the number of operations for block feature quantity creation becomes A×B×C×D; the number of operations for score derivation is A×B×C×D; and the number of operations for the determination is A×B. In addition, the quantity of generated intermediate data (ROI feature quantities in the comparative example 2) is 1,344 Byte (=10527×31×2), which is calculated by Block feature quantity data size×C×D.

Figure 17:
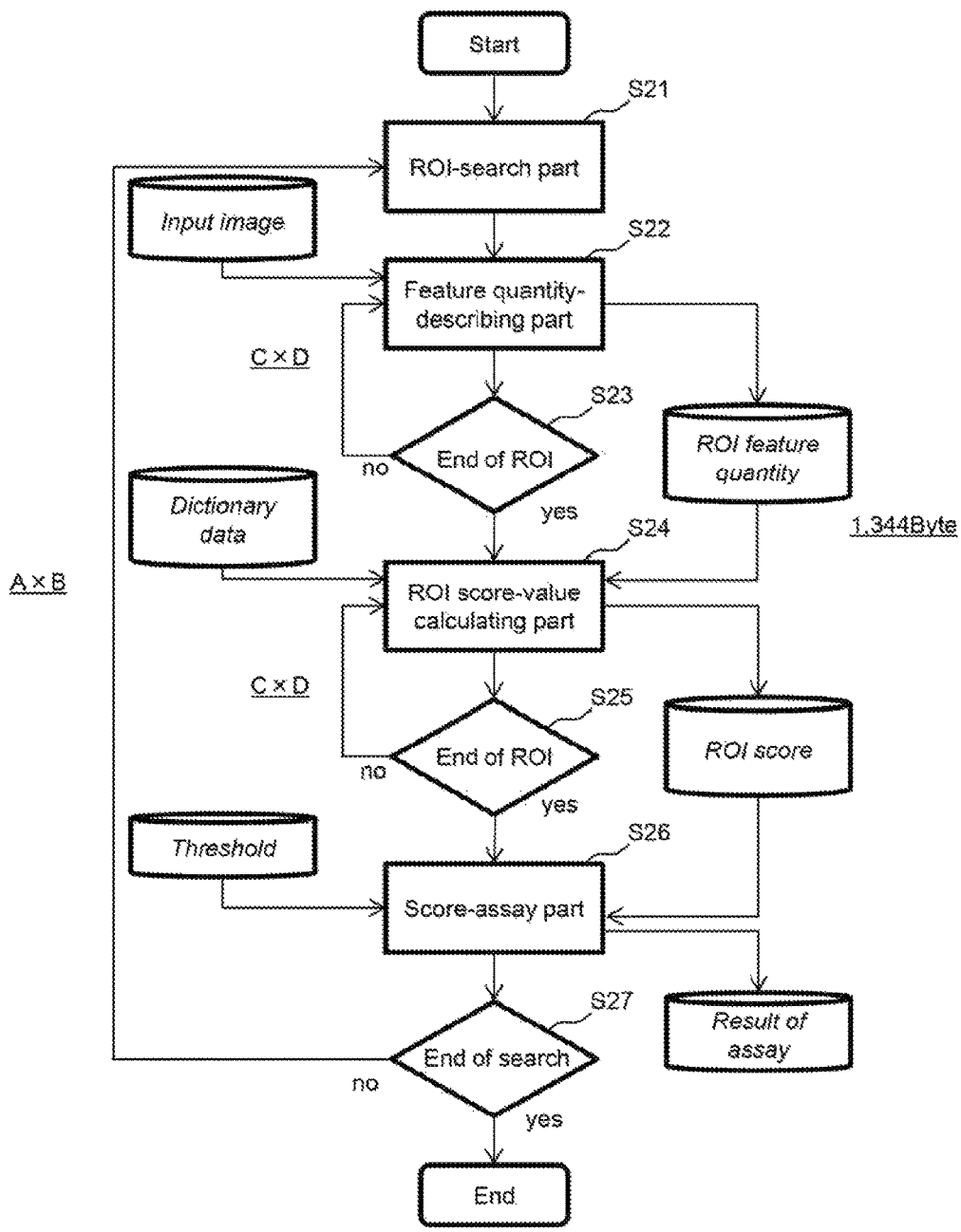
FIG. 17 is an explanatory diagram showing results of evaluation concerning the number of operations, and the data capacity (storage capacity or quantity of transmission) in the flow of the image recognition-processing method (comparative example 2) based on feature quantity creation in regions of interest.

FIG. 17 is an explanatory diagram showing results of evaluation concerning the number of operations, and the data capacity (storage capacity or quantity of transmission) in the flow of the image recognition-processing method (comparative example 2) based on feature quantity creation in regions of interest. FIG. 17 presents the same flow chart as that of FIG. 6; the number of operations and the data capacity (storage capacity or quantity of transmission) of intermediate data are shown together. The descriptions of the respective steps are omitted here. This is because they are the same as those shown in FIG. 6. The loop including the feature quantity-describing part S21 is arranged in the quadruple loop described above; the number of operations is A×B×C×D. The loop including the ROI score-value calculating part S24 is also arranged in the above quadruple loop; the number of operations is A×B×C×D. The loop including the score-assay part S28 is the outer double loop of the above quadruple loop; the number of operations is A×B. The data quantity of ROI feature quantities is 1,344 Byte as described above.

The loop according to the first embodiment includes: a double loop for score derivation; and a double loop arranged outside the double loop and including the block feature quantity creation and determination. The outer double loop is a double loop arranged so as to repeat the scan of an input image with a step width step_I_width in the horizontal direction and with a step width step_I_height in the vertical direction. The inner double loop is a double loop arranged so as to repeat the scan of blocks with a step width of one pixel in the horizontal and vertical directions. As a result, the number of operations for block feature quantity creation becomes A×B; the number of operations for score derivation is A×B×C×D; and the number of operations for the determination is A×B. In addition, the quantity of generated intermediate data (a score map in ROIs in the first embodiment) is 19,060 Byte (=4765×4), which is calculated by Score data size×Number of ROIs.

Figure 18:
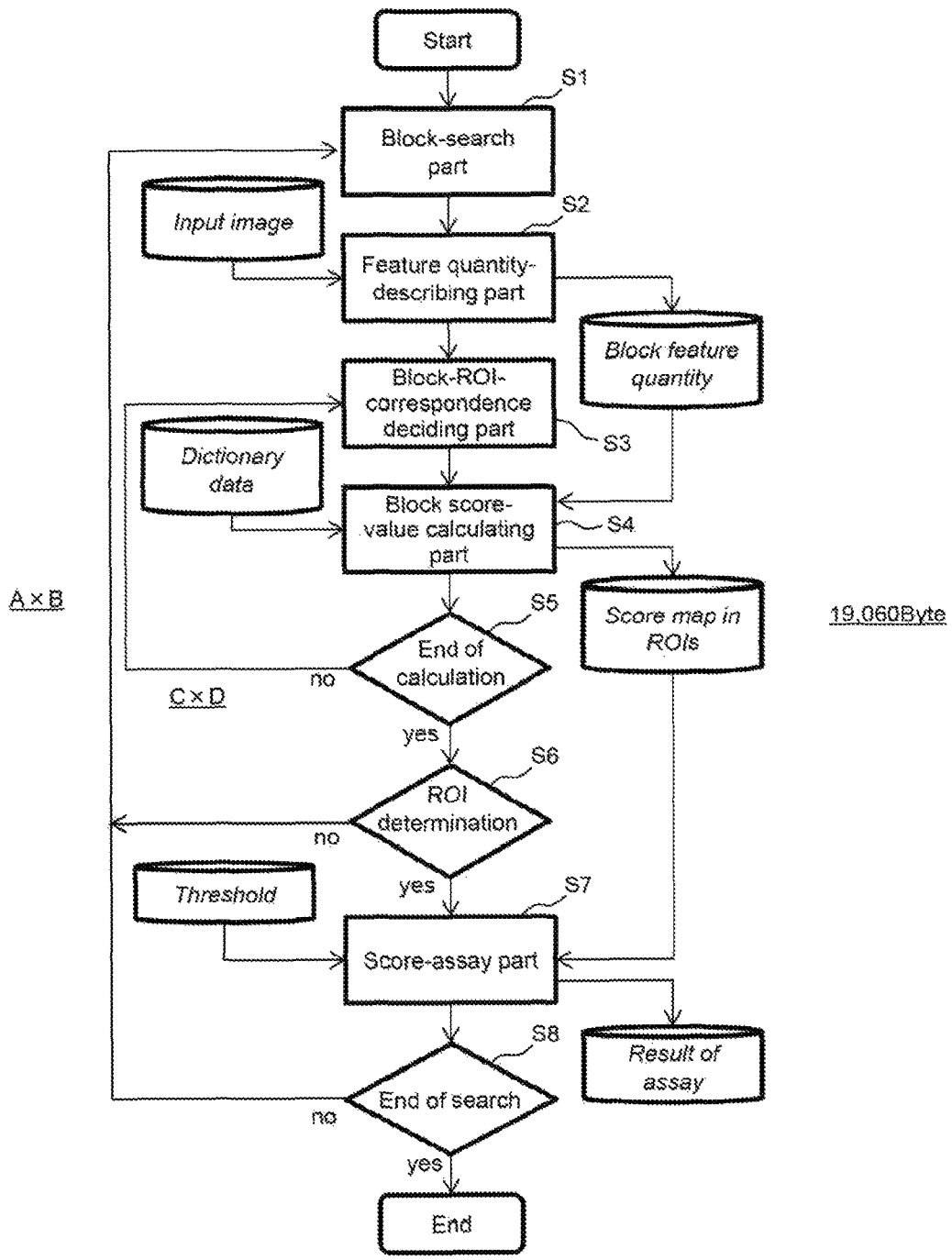
FIG. 18 is an explanatory diagram showing results of evaluation concerning the number of operations, and the data capacity (storage capacity or quantity of transmission) in the flow of the image recognition method according to the first embodiment.

FIG. 18 is an explanatory diagram showing results of evaluation concerning the number of operations, and the data capacity (storage capacity or quantity of transmission) in the flow of the image recognition-processing method according to the first embodiment. FIG. 18 presents the same flow chart as that of FIG. 10; the number of operations and the data capacity (storage capacity or quantity of transmission) of intermediate data are shown together. The descriptions of the respective steps are omitted here. This is because they are the same as those shown in FIG. 10. The loop including the block feature quantity-describing part S2 is arranged outside the inner double loop described above; the number of operations is A×B. The loop including the block score-value calculating part S4 is arranged in the above inner double loop; the number of operations is A×B×C×D. The loop including the score-assay part S28 is a double loop outside the inner double loop; the number of operations is A×B. In addition, the data quantity of a score map in ROIs is 19,060 Byte as described above.

As described above, in regard to the quantity of operations according to the first embodiment, the number of operations for block feature quantity creation, which is given by A×B, is largely suppressed in comparison to A×B×C×D, a number of operations in the comparative example 2, which is comparable to that in the comparative example 1. The data capacity (storage capacity or quantity of transmission) according to the first embodiment is larger than 1,344 Byte which is a data quantity of ROI feature quantities in the comparative example 2. However, the data quantity of a score map in ROIs is 19,060 Byte and the size of generated intermediate data can be reduced to about 2.8% of 673,728 Byte, which is a data capacity of a feature quantity map in the comparative example 1.

The embodiments of API (Application Programming Interface) in the cases of implementing, by software programs, the image recognition processes according to the above image recognition-processing methods will be described. API can be grasped through various functions for executing elemental processes, and a general program for calling for and executing the functions. For instance, the functions are provided as libraries; a user creates a general program for calling for and executing the functions.

FIG. 19 is an explanatory diagram for comparison of APIs in the cases of implementing, by software programs, image recognition processes according to the above methods.

The image recognition-processing method (comparative example 1) based on feature quantity map creation includes a function [1] for creating a feature quantity map, a function [2] for taking data of ROI region from the feature quantity map and linking the data, and a function [3] for deriving evaluation values with ROI feature quantities and dictionary data as inputs; the functions [1], [2] and [3] are called for and executed in this order. The function [1] is one arranged to create a feature quantity map from an input image, which is expressed as "create_feature_map (<input image>, <feature quantity map>, <another>)", for example. The function [2] is one arranged to take data of ROI region from a feature quantity map and link the data, which is expressed as "create_roi_feature (<feature quantity map>, <ROI feature quantity>, <another>)", for example. The function [3] is one to derive evaluation values with ROI feature quantities and dictionary data as inputs, which is expressed as "detector (<ROI feature quantity>, <dictionary data>, <evaluation value>, <another>)", for example. In the comparative example 1, the flow of the image recognition process involves: executing a function (group) for creating a feature quantity map; then computing, from a feature quantity map, feature quantities corresponding to the region of ROI to search to link the feature quantities; and calling for the function for performing an assay process with dictionary data at the end.

The image recognition-processing method (comparative example 2) based on feature quantity creation in regions of interest involves the function [1] for creating ROI feature quantities, and the function [2] for deriving evaluation values; the functions [1] and [2] are called for and executed in this order. The function [1] is one to create ROI feature quantities with an image and coordinates of a cutout in the image as inputs, which is expressed as "create_roi_feature (<input image>, <coordinate>, <ROI feature quantity>, <another>)", for example. The function [2] is one to derive evaluation values with ROI feature quantities and dictionary data as inputs, which is expressed as "detector (<ROI feature quantity>, <dictionary data>, <evaluation value>, <another>)", for example. In the comparative example 2, the flow of the image recognition process involves: calling for the function for computing feature quantities with the image of a rectangular region as an input; and then, calling for the function for performing an assay process with dictionary data.

In contrast, in the image-recognition method according to the first embodiment, API is a user interface arranged so that the cutout in ROIs by function is not performed, a whole range for searching an image is specified, and a function arranged to perform the feature quantity extraction and the assay in ROIs in parallel is called for once. It has a function [1] to send back detected coordinates with an image and dictionary data as inputs, and executes the function. The function [1] is expressed as "scan_detector (<input image>, <dictionary data>, <coordinate data array of results of detection>, <score map in ROIs>)", for example.

[Second Embodiment]

Figure 20:
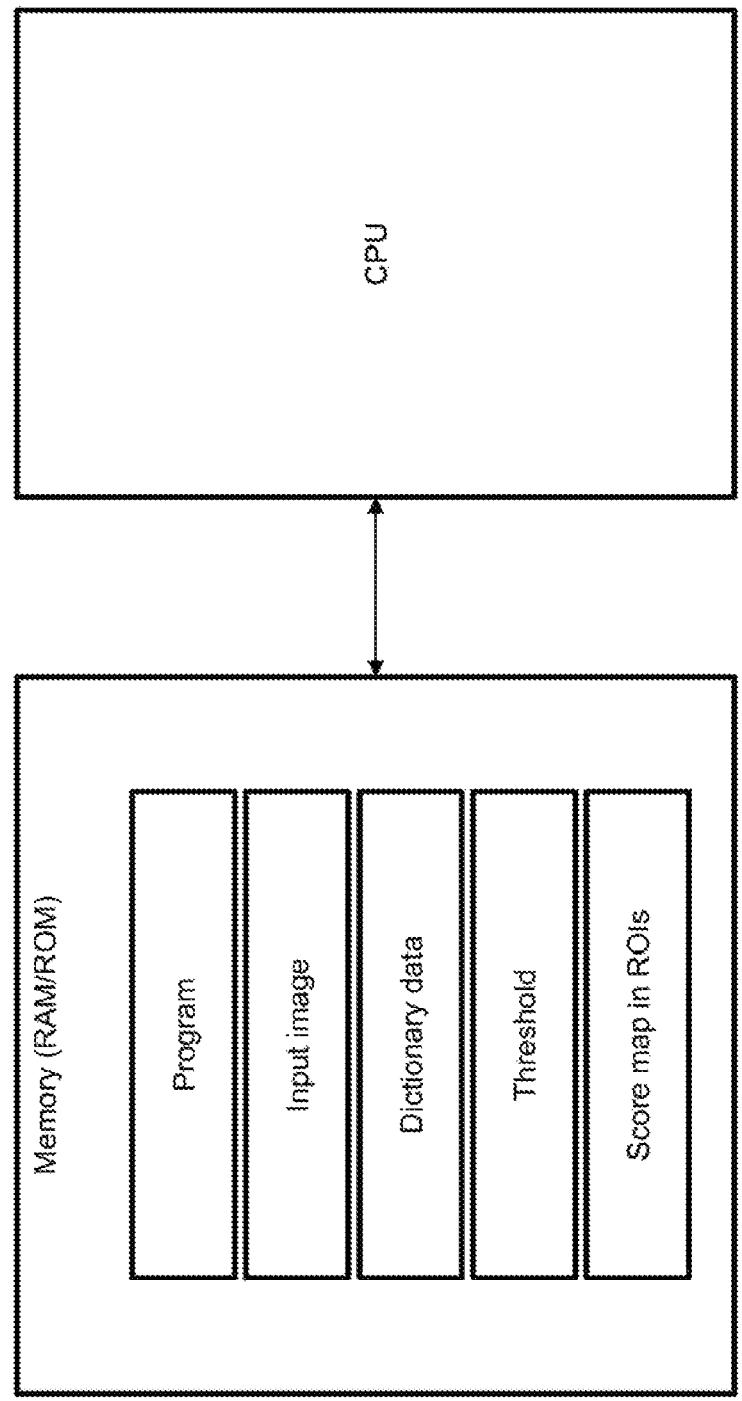
FIG. 20 is a schematic diagram showing an example of the configuration of a single processor which executes the image recognition process according to the first embodiment.

The image recognition process described in connection with the first embodiment can be implemented with a common single processor. FIG. 20 is a schematic diagram showing an example of the configuration of a single processor which executes the image recognition process according to the first embodiment, which includes one CPU and a memory such as RAM or ROM. The block-search part S1, the feature quantity-describing part S2, the block-ROI-correspondence deciding part S3, the block score-value calculating part S4, and the score-assay part S7 are saved in the memory such as RAM or ROM as programs. In addition, an input image, dictionary data, a threshold, and a score map in ROIs are also saved in the memory, which are read or written according to an input/output process. Based on the data and the programs, the image recognition process according to the first embodiment can be realized by a single processor having one CPU provided therein.

Although no special restriction is intended, a single processor like this is formed on a single semiconductor substrate of silicon or the like by using e.g. a known CMOS (Complementary Metal-Oxide-Semiconductor) LSI manufacturing technique.

[Third Embodiment]

Figure 21:
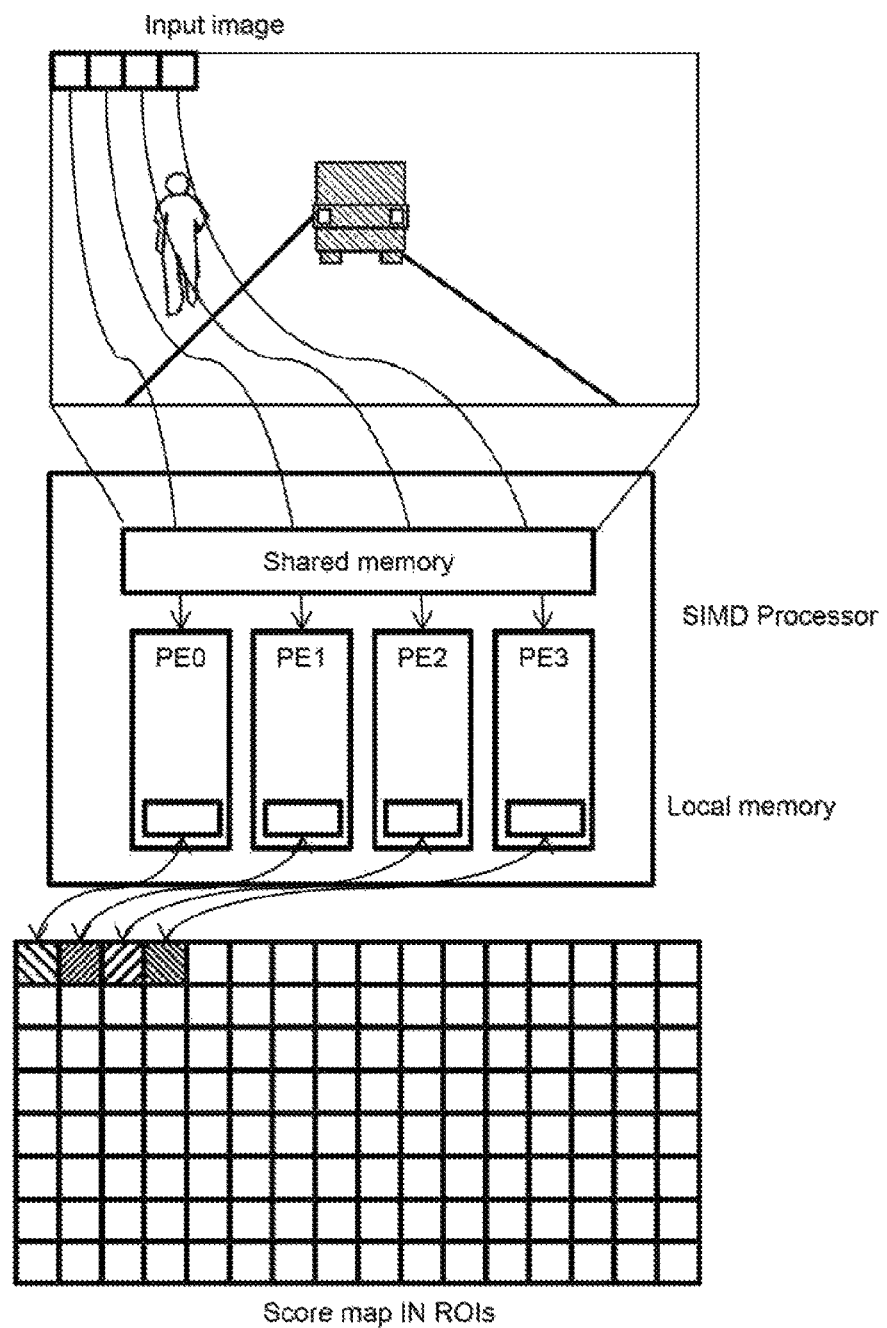
FIG. 21 is a schematic diagram showing an example of the configuration of a SIMD processor which executes the image recognition process according to the first embodiment.

The image recognition process according to the third embodiment is enabled by implementing a process arranged to take advantage of the parallel processability on a SIMD (Single Instruction Multiple Data) processor utilized as an accelerator for image processing. FIG. 21 is a schematic diagram showing an example of the configuration of such a SIMD processor, by which the image recognition process according to the third embodiment is executed. The SIMD processor includes: four processing elements PE0 to PE3 each having a local memory (PE: Processing Element); and a shared memory to which reference can be made from all of PEs. In a concrete example of the data-saving method, programs and input image data are saved in the shared memory to which reference can be made from all the PEs; data including dictionary data and a threshold are saved in the local memories of all the PEs so that identical values are put in the local memories of all the PEs. A score map in ROIs is divided by the number of the PEs into fractions, which are saved in the local memories respectively. In the case of implementation on a SIMD processor, feature quantity calculation and partial evaluation value calculation for one block are allocated to one PE; and a score map in ROIs is generated by transmitting partial evaluation values between PEs. A common CPU is required to sequentially execute, on one partial block, tasks or operations of a feature quantity calculation to a partial evaluation value calculation. However, in the case of performing the implementation with a SIMD processor, the image-recognition process can be further speeded up by executing, in parallel, partial feature quantity calculation and evaluation value calculation according to the number of parallel arrays of the PEs.

While in FIG. 21, a SIMD processor having four PEs is shown by example, the number of PEs is arbitrary. In addition, the image recognition process may be implemented on a parallel processor for which another architecture is adopted, such as MIMD (Multiple Instruction Multiple Data) processor. Although no special restriction is intended, a SIMD processor like this is formed on a single semiconductor substrate of silicon or the like by using e.g. the known CMOS LSI manufacturing technique.

While the invention made by the inventor has been concretely described above based on the embodiments, the invention is not limited to them. It is obvious that various changes or modifications thereof may be made without departing from the subject matter thereof.

What is claimed is:

1. An image recognition device for executing an image recognition process, the image recognition device comprising:
a processor; and
a memory,
wherein a program run by the processor executes the image recognition process,
wherein the image recognition process includes:
setting regions of interest in an image of an image plane;
searching for a region including a recognition-targeted image;
defining blocks each composed of pixels; and
holding, in the memory, dictionary data including feature quantities respectively calculated from blocks forming a recognition-targeted region corresponding to the recognition-targeted region including the recognition-targeted image and composed of blocks,
wherein, in the image recognition process, each region of interest is composed of a number of blocks which is the same as a number of blocks forming the recognition-targeted region, and
wherein the processor calculates feature quantities for each block in the image plane, to be block-of-interest feature quantities, and
wherein, for each region of interest, the processor:
calculates, with respect to each block, scores for regions of interest including the block, based on the block-of-interest feature quantities and feature quantities, included in the dictionary, calculated from a block, a position of which in the recognition-targeted region corresponds to positions of the block in each region of interest;
accumulatively adds the scores respectively for each region of interest; and
temporarily holds each score accumulatively added for each region of interest as an evaluation value of each region of interest in the memory,
wherein the processor then makes a determination about whether or not each region of interest includes the recognition-targeted image based on the evaluation value of the region of interest on which the accumulative addition has been finished on all of blocks forming the region of interest,
wherein the feature quantities are vector data, and
wherein the score is determined as inner products of the feature quantities calculated from a block corresponding to the block in the dictionary data and the block-of-interest feature quantities.

2. The image recognition device according to claim 1, wherein the feature quantities are defined from a histogram of gradation at edges of an image in a corresponding block.

3. The image recognition device according to claim 1, wherein a block targeted for calculation of the block-of-interest feature quantities is selected by a sequential scan in the image plane.

4. The image recognition device according to claim 3, wherein the sequential scan includes:
a scan on one image plane using a scanning pitch (width) of a block size; and
other scans on the image plane, in each of which its starting point is changed in turn from the preceding scan by the block size divided by an integer and its scanning pitches are the same as for the preceding scan.

5. The image recognition device according to claim 3, wherein:
the processor includes processing elements capable of executing identical instructions in parallel,
the memory includes local memories connected with the processing elements, respectively, and a shared memory which can be accessed by the processing elements in common,
the dictionary data are held by the shared memory, the intermediate data of the evaluation values are distributed to and held by the local memories for each of corresponding regions of interest, more than one block is selected in parallel by the sequential scan, and assigned to the processing elements respectively, the processing elements each calculates the block-of-interest feature quantities for a block assigned thereto, and each calculates a score to calculate from feature quantities calculated from a block corresponding to the block concerned in the dictionary data and the block-of-interest feature quantities for each of regions of interest including the block concerned, and each processing element transmits the score thus calculated to the local memory holding corresponding intermediate data.

6. The image recognition device according to claim 5, wherein the processing elements, the local memories, and the shared memory are formed on a single semiconductor substrate.

7. The image recognition device according to claim 1, wherein the processor and the memory are formed on a single semiconductor substrate.

8. The image recognition device according to claim 1, wherein the score calculated for an evaluation value for the region of interest is a scalar value and intermediate data is composed of one scalar value saved for each region of interest.

9. An image recognition method, comprising:
setting regions of interest in an image of one image plane;
searching for a region including a recognition-targeted image;
defining blocks each composed of pixels;
holding, in a memory, dictionary data including feature quantities respectively calculated from blocks forming a recognition-targeted region corresponding to the recognition-targeted region including the recognition-targeted image and composed of blocks, provided that each of the regions of interest is composed of blocks having a same number as a number of blocks forming the recognition-targeted region;
calculating feature quantities for each block in the image plane, to make block-of-interest feature quantities;
calculating, with respect to each block, scores for regions of interest including the block, based on the block-of-interest feature quantities and feature quantities, included in the dictionary, calculated from a block, a position of which in the recognition-targeted region corresponds to positions of the block in each region of interest;
accumulatively adding, the scores respectively for each region of interest and temporarily holding each score accumulatively added for each region of interest as an evaluation value of each region of interest; and
making a determination about whether each region of interest includes the recognition-targeted image based on an evaluation value of the region of interest on which the accumulative addition has been finished on all of blocks forming the region of interest,
wherein the feature quantities are vector data, and
wherein the score is determined as inner products of the feature quantities calculated from a block corresponding to the block in the dictionary data, and the block-of-interest feature quantities.

10. The image recognition method according to claim 9, wherein the feature quantities are defined from a histogram of gradation at edges of an image in a corresponding block.

11. The image recognition method according to claim 9, wherein a block targeted for calculation of the block-of-interest feature quantities is selected by sequential scan in the image plane.

12. The image recognition method according to claim 11, wherein the sequential scan includes:
a scan on one image plane at a pitch of a size of the block; and
other scans on the image plane, in each of which its starting point is changed in turn from the preceding scan by a block size divided by an integer and using a pitch the same as used for the preceding scan.

13. The image recognition method according to claim 12, wherein pitches are changed based on a driving speed.

14. The image recognition method according to claim 9, wherein the score calculated for an evaluation value for the region of interest is a scalar value and intermediate data is composed of one scalar value saved for each region of interest.

15. An image recognition device for executing an image recognition process, the image recognition device comprising:
a processor; and
a memory,
wherein a program run by the processor executes the image recognition process, the image recognition process including:
setting regions of interest in an image of an image plane;
searching for a region including a recognition-targeted image;
defining blocks each composed of pixels; and
holding, in the memory, dictionary data including feature quantities respectively calculated from blocks forming a recognition-targeted region corresponding to the recognition-targeted region including the recognition-targeted image and composed of blocks,
wherein, in the image recognition process, each region of interest is composed of a number of blocks which is the same as a number of blocks forming the recognition-targeted region, and
wherein the processor sequentially selects a block in the image plane as a concerned block and calculates feature quantities for each concerned block to be block-of-interest feature quantities,
wherein, for each time the concerned block is selected, the processor calculates sub-scores, for regions of interest including the concerned block selected, based on the block-of-interest feature quantity of the concerned block selected and feature quantities, included in the dictionary data, calculated from blocks, positions of which in the recognition-target region correspond to positions of the concerned block selected in the regions of interest, and accumulatively adds, for each of the regions of interest including the concerned block selected, the sub-scores to intermediate data of an evaluation value for each of the regions of interest respectively, the intermediate data being stored in a memory area allocated in the memory as an area for storing the evaluation value of each region of interest, and
wherein the processor makes determination about whether or not each region of interest includes the recognition-targeted image based on the evaluation value of the region of interest on which the sub-scores of all of blocks forming the region of interest are accumulatively added.

16. The image recognition device according to claim 15, wherein the accumulative adding of sub-scores of blocks that is stored to memory as immediate data comprises a scalar quantity and a usage of this scalar quantity as intermediate data reduces an amount of memory required and a number of operations required to determine recognition-targeted images in an image based on using a dictionary.

17. The image recognition device according to claim 15, wherein the feature quantity of each block of a region of interest is characterized as a vector having n elements and each block of dictionary data also has a feature quantity characterized as a vector having n elements.

18. The image recognition device according to claim 17, wherein a blockscore stored as intermediate data for a $block_i$ is: $blockscore_i = x_{i1} \times w_1 + x_{i2} \times w_2 + \ldots x_{im} \times w_m$.

19. The image recognition device according to claim 18, wherein the evaluation function of a region of interest is an accumulation of blockscores over the region of interest.

20. The image recognition device according to claim 15, wherein each block comprises a region of 8×8 pixels and wherein each ROI comprises 32 blocks of eight vertical blocks×four horizontal blocks.

\* \* \* \* \*